(12) United States Patent
Sorimoto

(10) Patent No.: US 11,273,586 B2
(45) Date of Patent: Mar. 15, 2022

(54) UNDERCUT PROCESSING MECHANISM, MOLD FOR MOLDING, AND MOLDED ARTICLE

(71) Applicant: Technocrats Corporation, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 40 days.

(21) Appl. No.: 16/719,637

(22) Filed: Dec. 18, 2019

(65) Prior Publication Data

US 2020/0147847 A1 May 14, 2020

Related U.S. Application Data

(63) Continuation of application No. PCT/JP2018/041765, filed on Nov. 9, 2018.

(51) Int. Cl.
*B29C 45/44* (2006.01)
*B29C 45/40* (2006.01)
(Continued)

(52) U.S. Cl.
CPC ...... *B29C 45/4435* (2013.01); *B29C 45/4005* (2013.01); *B22D 17/2236* (2013.01);
(Continued)

(58) Field of Classification Search
CPC . B29C 45/4435; B29C 45/44; B29C 45/4005; B29C 33/44; B29C 33/442; B29C 33/444
(Continued)

(56) References Cited

U.S. PATENT DOCUMENTS

2017/0297230 A1  10/2017  Sorimoto

FOREIGN PATENT DOCUMENTS

| CN | 203198196 U | 9/2013 |
| CN | 107303717 A | 10/2017 |

(Continued)

OTHER PUBLICATIONS

International Search Report and Written Opinion for International Application No. PCT/JP2018/041765, entitled Undercut Processing Mechanism, Mold for Molding, and Molded Article, dated Dec. 11, 2018.

(Continued)

*Primary Examiner* — Timothy Kennedy
*Assistant Examiner* — Asha A Thomas
(74) *Attorney, Agent, or Firm* — Hamilton, Brook, Smith & Reynolds, P.C.

(57) ABSTRACT

A undercut processing mechanism includes: a sliding piece having a molding core for molding an undercut portion; a holder having a guide for guiding the sliding piece so that a molding core is detached from the undercut portion; and a retaining piece slidably accommodated in the holder and slidably engaged with the sliding piece. One of the holders and the retaining piece can advance/retract relative to the other thereof. The retaining piece has a first engagement element and a second engagement element to be engaged with the sliding piece. The sliding piece is guided via the first engagement element and the second engagement element so that the molding core is detached from the undercut portion and moves away from the molded product.

8 Claims, 15 Drawing Sheets

(51) Int. Cl.
    *B22D 17/22*     (2006.01)
    *B29C 33/44*     (2006.01)
    *B29C 45/33*     (2006.01)

(52) U.S. Cl.
    CPC .............. *B29C 33/44* (2013.01); *B29C 45/33* (2013.01); *B29C 2045/338* (2013.01)

(58) Field of Classification Search
    USPC .................................................. 425/DIG. 58
    See application file for complete search history.

(56) References Cited

FOREIGN PATENT DOCUMENTS

| | | |
|---|---|---|
| EP | 3235618 A1 | 10/2017 |
| JP | 2014-097628 A | 5/2014 |
| JP | 2017-056474 A | 3/2017 |
| JP | 2018-114616 A | 7/2018 |
| KR | 100875848 B | 12/2008 |

OTHER PUBLICATIONS

International Preliminary Report on Patentability or International Application No. PCT/JP2018/041765, entitled Undercut Processing Mechanism, Mold for Molding, and Molded Article, dated May 11, 2021.

UNDERCUT PROCESSING MECHANISM, MOLD FOR MOLDING, AND MOLDED ARTICLE

CROSS REFERENCE TO THE RELATED APPLICATION

This application is a continuation application, under 35 U.S.C. § 111(a) of international patent application No. PCT/JP2018/041765, filed Nov. 9, 2018, the entire disclosure of which is herein incorporated by reference as a part of this application.

BACKGROUND OF THE INVENTION

Field of the Invention

The present invention relates to an undercut processing mechanism that is attached to and used in a forming mold for forming a molded product having an undercut portion, a forming mold, and a molded product.

Description of Related Art

In a forming mold for molding a molded product having an undercut portion, depending on the form of the molded product including the undercut portion, it might be impossible to detach the molded product from the forming mold by one ejection operation. In this case, a two-stage ejection mechanism for performing an ejection step in two stages is used.

For example, in the case where a molded product having a protruding part located at a pull-off-direction side from an undercut portion is molded by a forming mold having an undercut processing mechanism in which a holder, a retaining piece, a sliding piece, and a molding piece are unitized, it is impossible to properly detach the molded product from the forming mold with one ejection operation, because the molding piece sliding in the undercut pull-off direction collides with the protruding part. For molding such a molded product, a forming mold having an undercut processing mechanism and a two-stage ejection mechanism as shown in Patent Document 1 is used.

RELATED DOCUMENT

Patent Document

[Patent Document 1] JP Laid-open Patent Publication No. 2014-097628

As compared to a one-stage ejection mechanism, the two-stage ejection mechanism has a large number of components and has a complicated structure, and therefore, the forming mold is inevitably large. In these days, there is a high demand for compactification and weight reduction of forming molds, and for a molded product having a protruding part located at a pull-off-direction side from an undercut portion, such a forming mold that allows molding with a one-stage ejection operation is expected to be developed.

SUMMARY OF THE INVENTION

An object of the present invention is to provide: an undercut processing mechanism and a forming mold that are compact and enable a molded product to be easily demolded even if the molded product has a protruding part located at a pull-off-direction side from an undercut portion; and such a molded product.

An undercut processing mechanism of the present invention is attached to and used in a fixed die or a movable die of a forming mold for molding a molded product having an undercut portion, the undercut processing mechanism including: a sliding piece having a molding core for forming the undercut portion; a holder provided to the fixed die or the movable die, the holder having a guide configured to guide the sliding piece so that the molding core is detached from the undercut portion; and a retaining piece slidably accommodated in the holder and slidably engaged with the sliding piece, wherein the holder and the retaining piece are configured such that one of the holder and the retaining piece is allowed to advance/retract relative to the other thereof, the sliding piece and the retaining piece have engagement units that are slidably engaged with each other, the engagement unit of the retaining piece includes a first engagement element and a second engagement element formed contiguously to the first engagement element, the first engagement element guides the sliding piece so that the molding core is detached from the undercut portion, and the second engagement element guides the sliding piece so that the molding core completely detached from the undercut portion moves away from the molded product, or guides the sliding piece so that the molding core in a process of being detached from the undercut portion continues being detached from the undercut portion and moves away from the molded product, thus enabling the molding core to be detached from the undercut portion and move away from the molded product.

In the undercut processing mechanism of the present invention, the first engagement element may be provided in parallel to a pull-off direction of the undercut portion, and the second engagement element may be provided so as to cross the pull-off direction of the undercut portion.

In the undercut processing mechanism of the present invention, the engagement unit are formed as a protrusion and a dovetail groove to be slidably fitted to the protrusion, the first engagement element and the second engagement element are both formed as a protrusion or both formed as a dovetail groove, and one of the sliding piece and the retaining piece may have the protrusion and the other thereof may have the dovetail groove.

In the undercut processing mechanism of the present invention, the holder may be fixed to a movable-side die plate having a core for forming an inner side of the molded product, or may be formed integrally with the movable-side die plate, an ejection pin may be provided which causes the retaining piece to advance or retract in synchronization with an ejector mechanism for ejecting the molded product, and the retaining piece may be ejected along with an ejection operation for the molded product, so that the molding core moves so as to be detached from the undercut portion and be away from the molded product.

In the undercut processing mechanism of the present invention, the movable die may include: a movable-side die plate having a core for forming an inner side of the molded product; and a movable-side receiving plate capable of advancing/retracting relative to the movable-side die plate. The movable die may further include: a first molding core for forming the undercut portion; and a second molding core which, in a mold clamped state, is adjacent to the first molding core and forms an inner side of the molded product. An interval restrictor may be connected with the fixed die and the movable-side die plate, and may restrict an interval between the fixed die and the movable-side die plate at a time of mold opening. The holder and the second molding core may be fixed to the movable-side receiving plate. The retaining piece may be fixed to the movable-side die plate. When the movable die retracts from the fixed die through mold opening and reaches a position restricted by the interval restrictor, retraction of the movable-side die plate may be stopped and only the movable-side receiving plate may continue retracting. By the movable-side receiving plate being separated from the movable-side die plate, the molding core may move so as to be detached from the undercut portion and be away from the molded product.

The undercut processing mechanism of the present invention may further include: a driving unit configured to advance/retract the retaining piece. The fixed die may include: a fixed-side die plate having a cavity for forming an outer side of the molded product; and a fixed-side attachment plate having a housing portion for the driving unit and connected with the fixed-side die plate. The holder may be fixed to or formed integrally with the fixed-side die plate. The retaining piece may be accommodated or housed in the housing portion, and may be ejected by the driving unit in conjunction with mold opening, so that the molding core moves so as to be detached from the undercut portion and be away from the molded product.

A forming mold of the present invention includes the undercut processing mechanism.

A molded product of the present invention is molded by the undercut processing mechanism or the forming mold, the molded product having a protruding part located at a pull-off-direction side from the undercut portion.

The present invention can provide: an undercut processing mechanism and a forming mold that are compact and enable a molded product to be easily demolded even if the molded product has a protruding part located at a pull-off-direction side from an undercut portion; and such a molded product.

DESCRIPTION OF EMBODIMENTS

Figure 1:
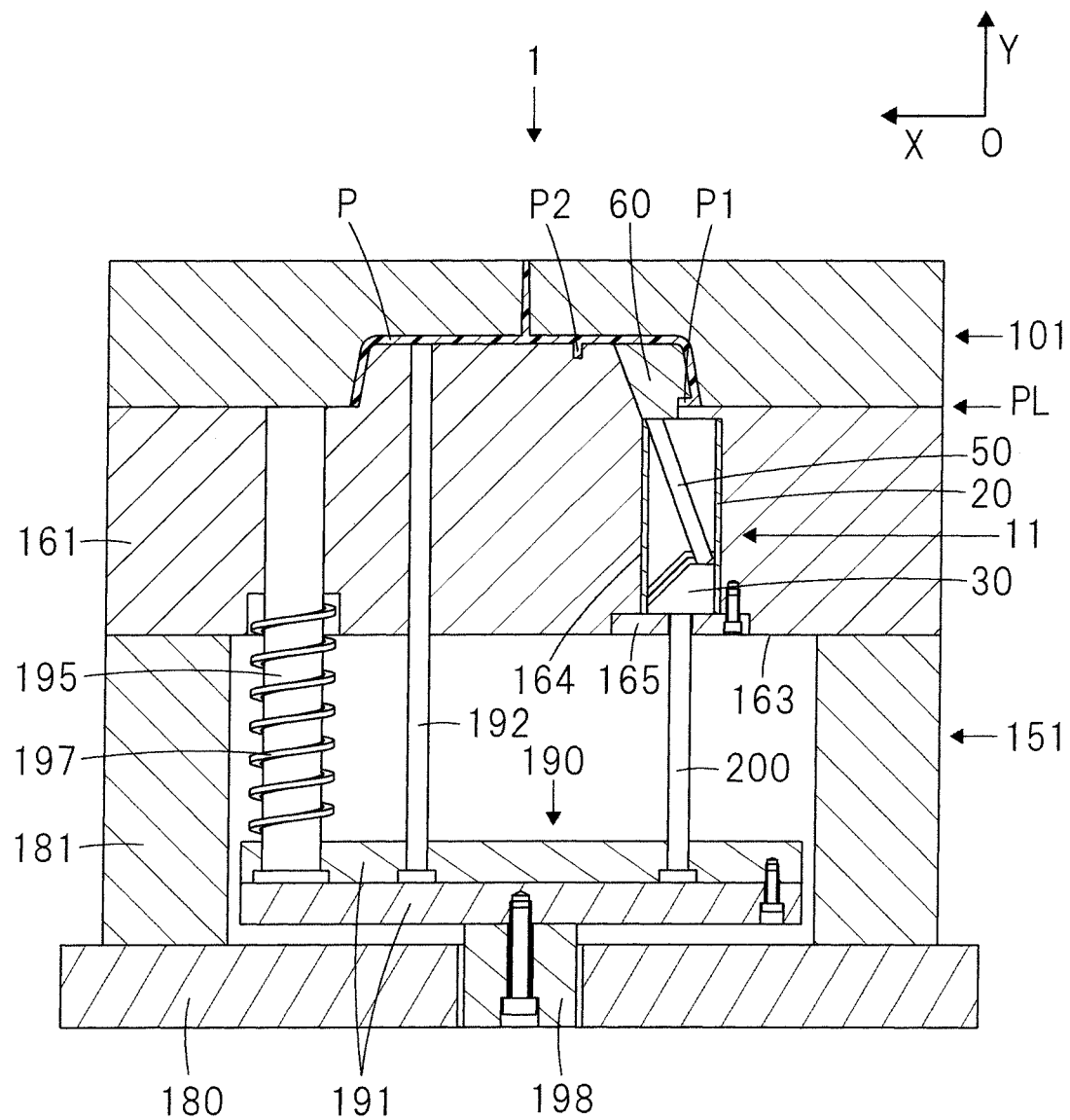
FIG. 1 is a sectional view of a forming mold 1 according to the first embodiment of the present invention at the time of mold clamping.
Figure 2:
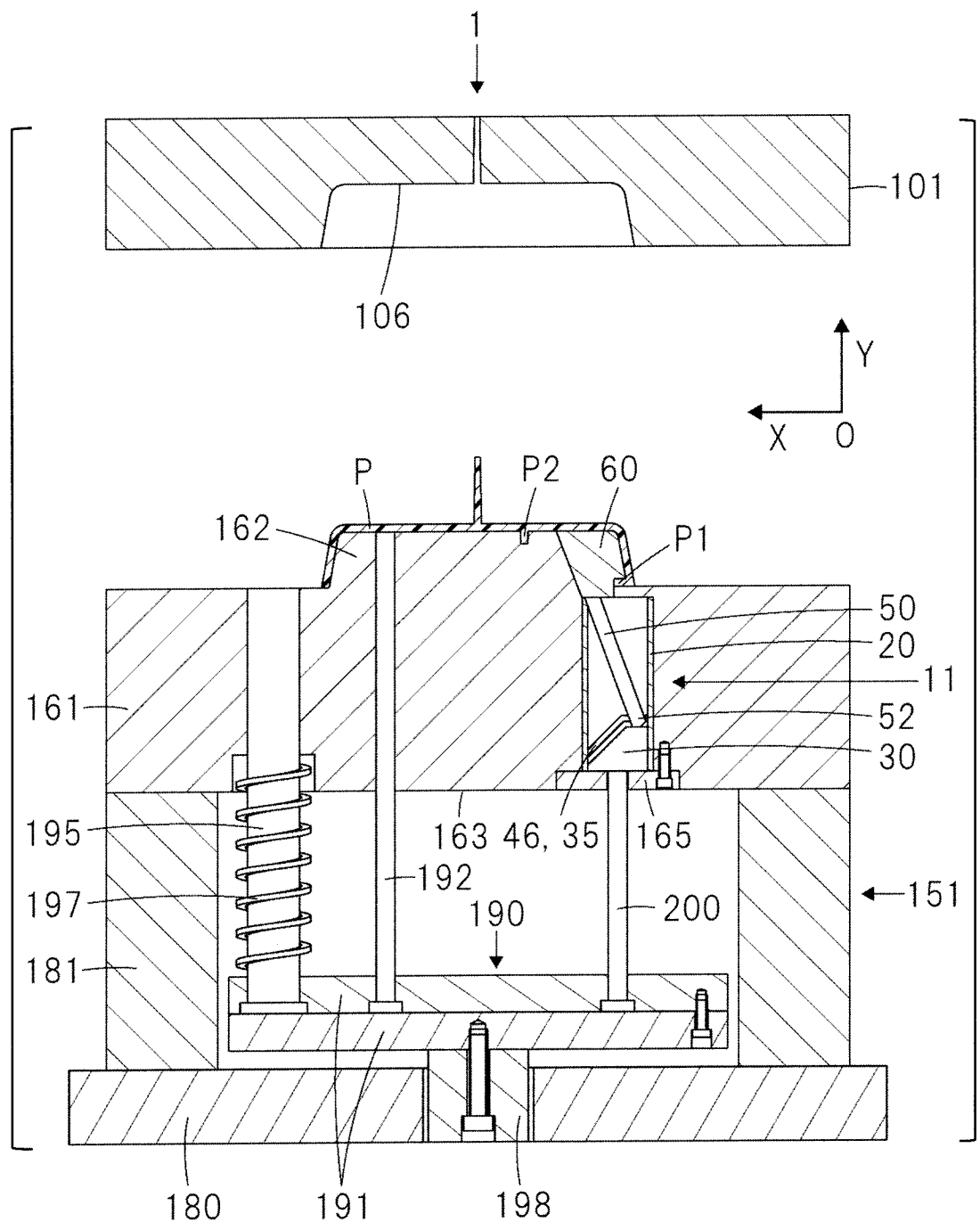
FIG. 2 is a sectional view of the forming mold 1 according to the first embodiment of the present invention at the time of mold opening.
Figure 3:
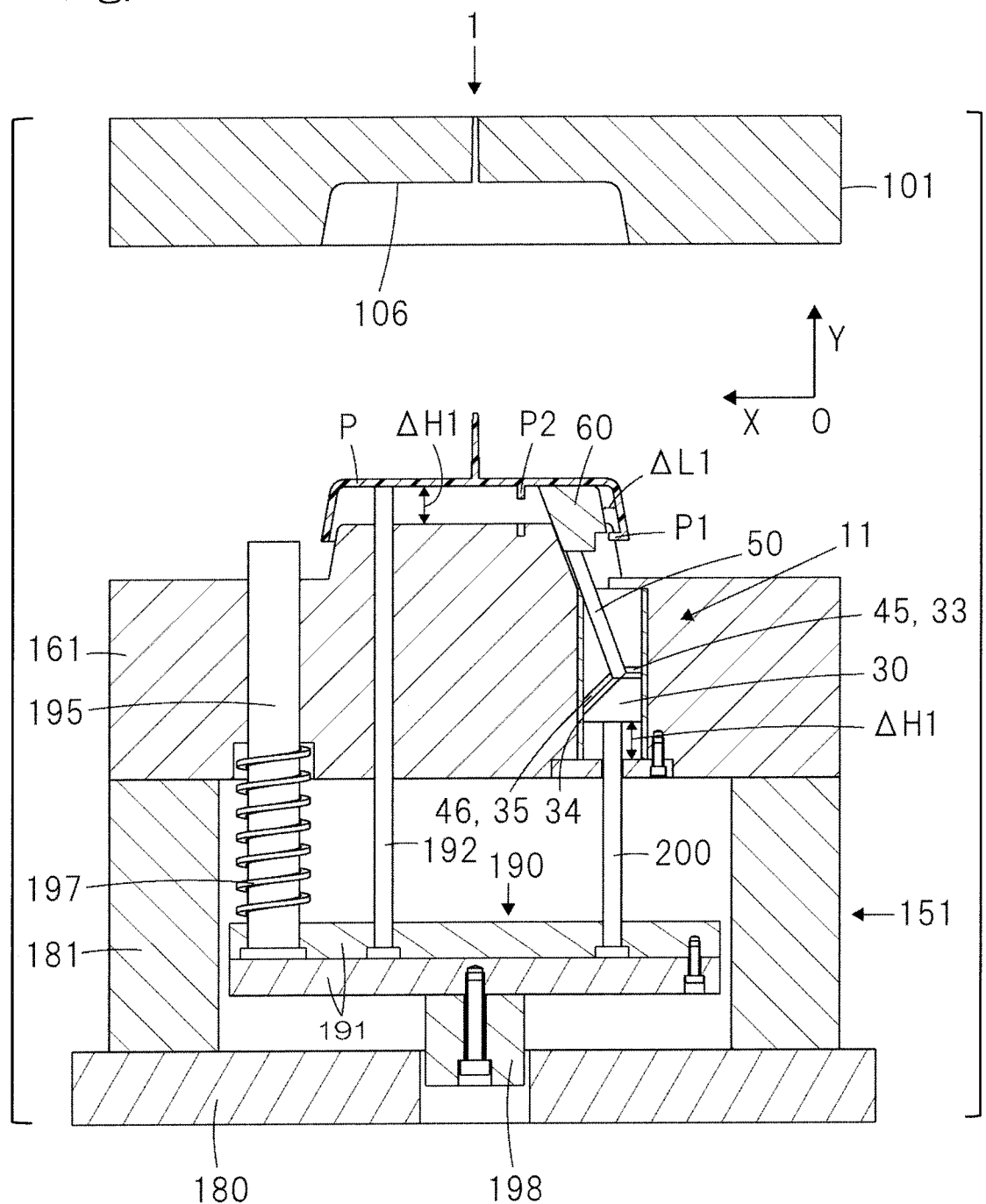
FIG. 3 is a sectional view of the forming mold 1 according to the first embodiment of the present invention during an operation of ejecting a molded product P.
Figure 4:
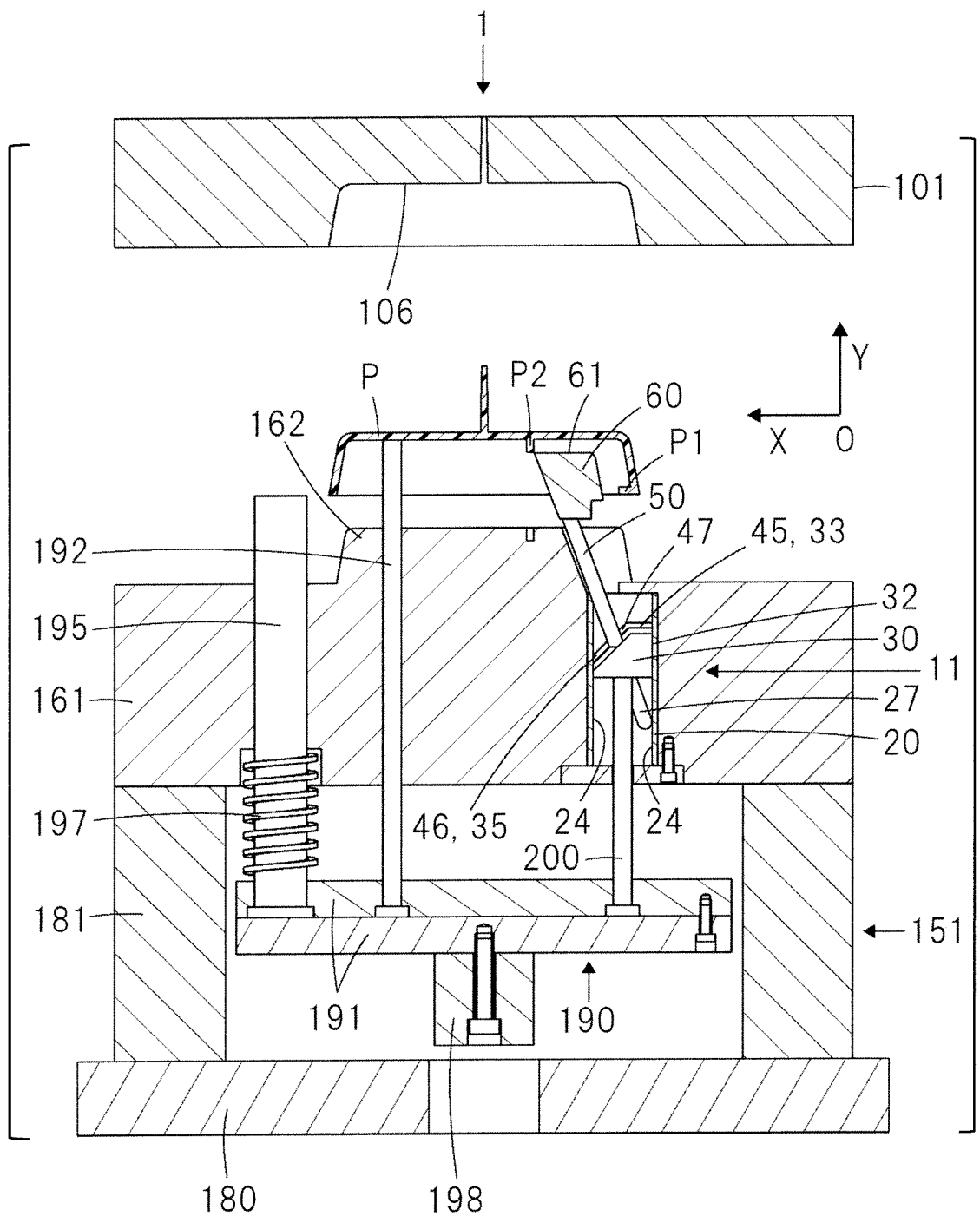
FIG. 4 is a sectional view of the forming mold 1 according to the first embodiment of the present invention during the operation of ejecting the molded product P.
Figure 5:
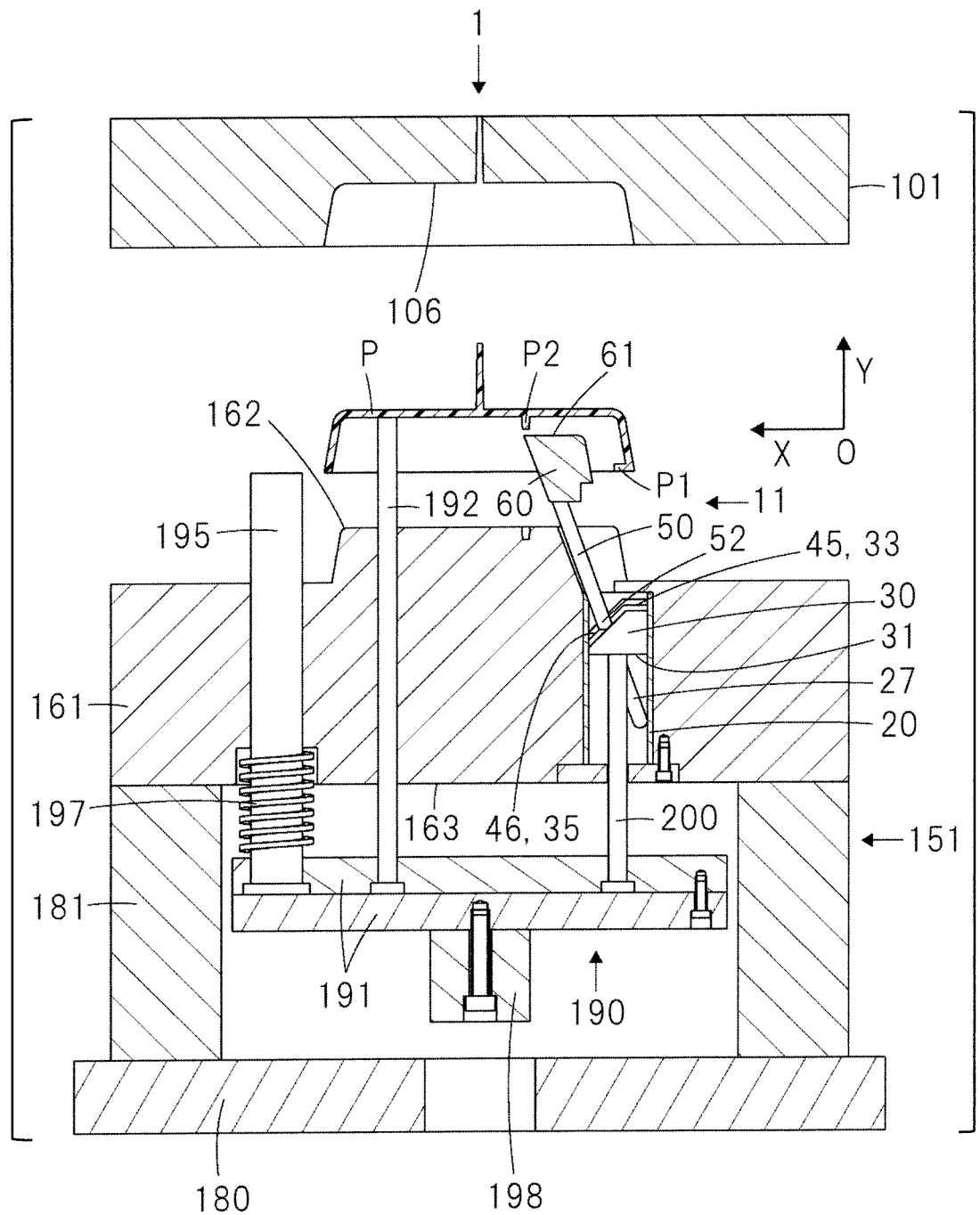
FIG. 5 is a sectional view of the forming mold 1 according to the first embodiment of the present invention during the operation of ejecting the molded product P.

FIG. 1 and FIG. 2 are sectional views of a forming mold 1 according to the first embodiment of the present invention at the time of mold clamping and after mold opening, respectively. FIG. 3 to FIG. 5 are sectional views of the forming mold 1 during an operation of ejecting a molded product P.

As in a known injection mold, the forming mold 1 according to the first embodiment of the present invention includes: a fixed die 101 for forming the outer surface side of the molded product P; a movable die 151 for forming the inner surface side of the molded product P; and an undercut processing mechanism 11. For convenience sake, the fixed die 101 side in FIG. 1 is defined as upper side and the movable die 151 side is defined as lower side. In addition, in the following description, a left side refers to the left side in FIG. 1, and a right side refers to the side opposite thereto, unless otherwise specified.

The fixed die 101 has a cavity 106 for forming the outer surface side of the molded product P. The movable die 151 includes: a movable-side die plate 161 having a core 162 for forming the inner surface side of the molded product P; a movable-side attachment plate 180; a spacer block 181; two ejector base plates 191; an ejector pin 192; a return pin 195; a spring 197; and an ejector rod 198. The ejector base plate 191, the ejector pin 192, the ejector rod 198, and the like cooperate together to form an ejector mechanism 190. The ejector mechanism 190 of the present embodiment is a one-stage ejection mechanism.

The forming mold 1 undergoes a molding step, a cooling step, and then mold opening, and the ejector base plate 191 is moved so as to approach the movable-side die plate 161 in a demolding direction of the molded product P (upward direction, i.e., Y direction, in FIG. 1), thereby eject the molded product P by the ejector pin 192. The above components and operations are the same as in a known injection mold, and therefore, the description thereof is omitted.

In the present embodiment, an undercut portion P1 is a protruding portion P1 that protrudes inward of the molded product P from an end of the molded product P, so as to cross the demolding direction (Y direction) of the molded product P. In addition, the molded product P shown in the present embodiment has, at a pull-off-direction (X direction) side from the undercut portion P1, a protruding portion P2 protruding inward of the molded product P. The shapes of the molded product P, the protruding portion P1, and the protruding portion P2 are not particularly limited, and the material for the molded product P may be a synthetic resin such as plastic, or may be a metal such as iron, copper, or aluminum.

The undercut processing mechanism 11 forms the undercut portion P1 at the time of molding of the molded product P, and performs detachment from the undercut portion P1 at the time of ejection of the molded product P in synchronization with the ejector mechanism 190, thus allowing the molded product P to be demolded from the forming mold 1.

The undercut processing mechanism 11 includes: a holder 20 embedded and fixed in the movable-side die plate 161; a molding core 60 for forming the undercut portion P1 of the molded product P; a sliding piece 50 connected with the molding core 60, and a retaining piece 30 for slidably retaining the sliding piece 50.

The holder 20 is fitted into a recess 164 provided so as to face a bottom surface 163 side in the movable-side die plate 161, and is embedded and fixed in the movable-side die plate 161 with a fixed plate 165. The holder 20 accommodates or houses the sliding piece 50 and the retaining piece 30, and restricts the movement directions of the sliding piece 50 and the retaining piece 30.

The holder 20 is formed by combining two half-split holder members having the same shape, and is formed in a box-like tube shape having an internal space with an upper end surface and a lower end surface opened. The holder 20 may be formed from a plurality of divided members, or may be formed integrally with the movable-side die plate 161. The holder 20 has both inner side surfaces 24, which serve as a guide for the retaining piece 30, and the holder 20 has, on front-side and back-side inner surfaces, which are provided with oblique grooves 27 for guiding the sliding piece 50.

Each oblique groove 27 is formed so as to be inclined with respect to the mold opening direction (Y direction) of the forming mold 1, and the sliding piece 50 as described later is slidably fitted to oblique groove 27. The oblique groove 27 restricts the movement direction of the sliding piece 50 in the direction (X direction), in which the molding core 60 connected with the sliding piece 50 is detached from the undercut portion P1, in synchronization with the ejector mechanism 190. It is noted that the direction in which the molding core 60 is detached from the undercut portion P1 means a direction in which the molding core 60 is detached from the undercut portion P1 without deforming or damaging the undercut portion P1.

The oblique groove 27 of the holder 20 is designed such that the molding core 60 is detached from the undercut portion P1 of the molded product P at the time of ejection of the molded product P, in accordance with the shape of the undercut portion P1 of the molded product P, in particular, a protruding amount of the undercut portion P1 in the X direction, and a stroke of an ejection pin 200.

The shape of the holder 20 is not limited to a specific shape, but may be any shape that enables the movement directions of the sliding piece 50 and the retaining piece 30 to be restricted so that the molding core 60 forms the undercut portion P1 at the time of molding of the molded product P, and the molding core 60 is detached from the undercut portion P1 at the time of ejection of the molded product P.

The retaining piece 30 roughly has a shape obtained by straightly cutting the left side of a rectangular parallelepiped. In more detail, a bottom surface 31 of the retaining piece 30 is flat, and a right side surface 32 thereof is a planar surface perpendicular to the bottom surface 31. An upper surface 33 of the retaining piece 30 is parallel to the bottom surface 31, and a left side surface 34 of the retaining piece 30 is a planar surface perpendicular to the bottom surface 31. The upper surface 33 of the retaining piece 30 is shorter than the bottom surface 32 thereof, the left side surface 34 of the retaining piece 30 is shorter than the right side surface 32 thereof. An upper left part of the retaining piece 30 is formed to be a slope surface 35. The slope surface 35 is connected to an end of the upper surface 33 and an end of the left side surface 34.

On the upper surface 33 of the retaining piece 30, an engagement rib or an engagement protrusion 45 is provided so as to extend in the X direction over the entire length of the upper surface 33. On the slope surface 35, an engagement protrusion 46 parallel to the slope surface 35 is formed over the entire length of the slope surface 35. The protrusion 46 is highest at an end of the upper surface 33 that corresponds to a connection portion 47 between the protrusion 46 and the protrusion 45, and is lowest at an end connected to the left side surface 34. That is, the protrusion 46 has a descending slope such that, with the connection portion 47 defined as a proximal end, a distal end is positioned between the X direction and the –(minus) Y direction.

The protrusion 45 and the protrusion 46 are provided in the same form, and the protrusion 45 and the protrusion 46 are connected with each other. The protrusion 45 and the protrusion 46 are formed such that a dovetail groove provided at a lower end 52 of the sliding piece 50 can smoothly move along these protrusions 45, 46 including the connection portion 47. In the present embodiment, the protrusion 45 and the protrusion 46 form engagement units provided to the retaining piece 30, and the dovetail groove provided at the lower end 52 of the sliding piece 50 is an engagement unit provided to the sliding piece 50. More specifically, the protrusion 45 forms a first engagement element for guiding the sliding piece 50 so that the molding core 60 is detached from the undercut portion P1, and the protrusion 46 forms a second engagement element which is formed contiguously to the first engagement element and which guides the sliding piece 50 so that the molding core 60 detached from the undercut portion P1 moves away from the molded product P.

The protrusion 45 is formed in parallel to the direction of pulling-off from the undercut portion P1 and has a length L1 set to a length required for the molding core 60 to be detached from the undercut portion P1 via the slidably engaged sliding piece 50 when the retaining piece 30 moves in the demolding direction (Y direction), in synchronization with the ejector mechanism 190. It suffices that the length L1 of the protrusion 45 is a length required for pulling-off from the undercut portion P1, and the length L1 should not be increased more than necessary.

The protrusion 46 is formed so as to cross the direction of pulling-off from the undercut portion P1. More specifically, the slope angle and the length of the protrusion 46 are set so that, when the molding core 60 is detached from the undercut portion P1 and the ejection operation for the molded product P is continued after the detachment from the undercut portion P1, the molding core 60 moves under the protruding portion P2 located at a pull-off-direction (X direction) side from the undercut portion P1. Thus, the molding core 60 is prevented from colliding with the protruding portion P2.

The ejection pin 200 fixed to the ejector base plate 191 is connected with the bottom surface 31 of the retaining piece 30, whereby the retaining piece 30 is accommodated or housed in the holder 20. With the right side surface 32 and the left side surface 34 of the retaining piece 30 in slidable contact with both inner side surfaces 24 of the holder 20, the retaining piece 30 moves in the demolding direction (Y direction) by being ejected by the ejection pin 200.

The sliding piece 50 is a straight-shaped bar member. The molding core 60 is attached to the tip end of the sliding piece 50, and the dovetail groove to be slidably engaged with the protrusion 45 and the protrusion 46 of the retaining piece 30 is provided at the lower end 52 of the sliding piece 50. The sliding piece 50 has a rectangular cross section and is formed such that a part of the front-surface side and a part of the back-surface side thereof are fitted into both oblique grooves 27 of the holder 20 with no gaps therebetween, so as to be slidable while being guided by the oblique grooves 27 of the holder 20. Thus, a part of the front surface and a part of the back surface of the sliding piece 50 form ridges slidably fitted into the oblique grooves 27.

The sliding piece 50 is accommodated or housed in the holder 20 such that the dovetail groove at the lower end is engaged with the protrusions 45, 46 of the retaining piece 30, and the sliding piece 50 is fitted into the oblique grooves 27 of the holder 20. Thus, the sliding piece 50 moves along the oblique grooves 27 of the holder 20 in conjunction with movement of the retaining piece 30 in the Y direction. The lower end 52 of the sliding piece 50 has a semicircular shape or an arc shape in a front view (see FIG. 1) and a back view, and thus, can smoothly move on the connection portion 47 between the protrusion 45 and the protrusion 46 of the retaining piece 30. However, the form of the lower end 52 of the sliding piece 50 is not particularly limited as long as the lower end 52 can smoothly move on the protrusion 45 and the protrusion 46 of the retaining piece 30, and further, on the connection portion 47 thereof.

The molding core 60 is a block member having a shape fitting to a part of the molded product P including the undercut portion P1, and is fixed to the upper end surface of the sliding piece 50 by screwing or the like. The shape of the molding core 60 is designed in accordance with the shape of the molded product P. The molding core 60 may be formed integrally with the sliding piece 50.

The operation and action of the forming mold 1 according to the present embodiment will be described with reference to an example in which the molded product P is formed by injection molding in the forming mold 1. During molding of the molded product P, the sliding piece 50 is housed in the holder 20 provided in the movable-side die plate 161, and is located so as to allow the molding core 60 to form the undercut portion P1 of the molded product P (see FIG. 1). In the forming mold 1, parting surfaces (PL surfaces) of the fixed die 101 and the movable die 151 are fitted to each other, and a melted material is injected to mold the molded product P.

After the injection step and the cooling step for the melted material are finished, mold opening is performed, to shift to a step of extracting the molded product P. The operation of the forming mold 1 in the extraction step is as follows.

After the mold opening, the ejector rod 198 is pushed by an ejection device (not shown), whereby the ejector base plate 191 moves upward (Y direction). Along with this, the ejector pin 192 standing on the ejector base plate 191 ejects the molded product P in the Y direction.

At the same time, the retaining piece 30 housed in the holder 20 is ejected by the ejection pin 200, whereby the retaining piece 30 moves in the Y direction by the same amount as the ejector pin 192. Along with the movement of the retaining piece 30 in the Y direction, the sliding piece 50 having the dovetail groove engaged with the protrusion 45 of the retaining piece 30 moves along the oblique grooves 27 of the holder 20 from the molding position shown in FIG. 1. Thus, the molding piece 60 moves in both of the Y direction and the X direction, so as to move away from the undercut portion P1.

When the ejector base plate 191 is lifted by ΔH1 from the mold clamped state, the sliding piece 50 is pushed by the retaining piece 30 whereby the sliding piece 50 is lifted by ΔH1 and moves by ΔL1 in the X direction along the protrusion 45 of the retaining piece 30. The molding core 60 connected with the sliding piece 50 also moves by ΔH1 in the Y direction and by ΔL1 in the X direction, so as to be completely detached from the undercut portion P1 (see FIG. 3).

The length L1 of the protrusion 45 is the same as ΔL1. When the ejector base plate 191 is lifted by ΔH1 from the mold clamped state, the lower end 52 of the sliding piece 50 is located at the left end of the protrusion 45. At this point of time, the molded product P has not reached a position where the molded product P can be extracted from the fixed die 151 (see FIG. 3). Therefore, the ejector base plate 191 continues being lifted, and the ejector pin 192 continues ejecting the molded product P while being in contact with the inner side of the molded product P (see FIG. 4).

The retaining piece 30 is also lifted by the same amount as the ejector pin 192 along with the lifting of the ejector base plate 191. Meanwhile, the lower end 52 of the sliding piece 50 transfers from the protrusion 45 to the protrusion 46 of the retaining piece 30 and moves along the protrusion 46. At this time, the sliding piece 50 moves in the Y direction and the X direction along the oblique grooves 27, but the lifted amount thereof is smaller than the lifted amount of the retaining piece 30 because the protrusion 46 has a descending slope.

That is, when the ejector base plate 191 is further lifted beyond ΔH1, the interval between the upper surface 61 of the molding core 60 and the inner surface of the molded product P is expanded with the lifting. Thus, even when the ejector base plate 191 is further lifted beyond ΔH1 and the molding core 60 moves in the X direction, the molding core 60 passes under the protruding portion P2 (see FIG. 4). Therefore, it is possible to extract the molded product P without the molding core 60 colliding with the protruding portion P2 (see FIG. 5).

After the molded product P is extracted, the forming mold 1 is clamped again in order to mold the next molded product P. At the time of mold clamping, the entire movable die 151 moves upward in FIG. 5, and the ejector base plate 191 moves downward in FIG. 5. In the undercut processing mechanism 11, the retaining piece 50 moves in a direction opposite to the previous direction, in conjunction with movement of the movable die 151, whereby the upper surface 61 of the molding core 60 becomes flush with the upper surface of the movable-side die plate 161. After mold clamping is completed, the molding material is injected to mold the next molded product P. The operation of the forming mold 1 from the mold opened state to the mold clamped state is basically the same as the operation of a conventional forming mold having an undercut processing mechanism.

As described above, in the forming mold 1 and the undercut processing mechanism 11 according to the first embodiment, the retaining piece 30 is lifted while sliding in the holder 20 in conjunction with the extraction operation for the molded product P in the forming mold 1, and the sliding piece 50 is guided by the holder 20, whereby the molding core 60 moves so as to be detached from the undercut portion P1. Thus, with a compact and simple structure, the undercut portion P1 can be pulled out easily and assuredly.

Moreover, in the forming mold 1 and the undercut processing mechanism 11 according to the first embodiment, after the molding core 60 is moved so as to be pulled off from the undercut portion P1, the molding core 60 is further moved away from the molded product P in conjunction with the extraction operation for the molded product P. Therefore, it is possible to easily and assuredly demold the molded product P even if the molded product P has the protruding portion P2 located at a pull-off-direction side from the undercut portion P1.

In addition, the undercut processing mechanism 11 according to the first embodiment can be incorporated into the forming mold 1 in a state in which the sliding piece 50 and the retaining piece 30 are housed in the holder 20. Therefore, the undercut processing mechanism 11 can be formed compactly and can be easily mounted to the forming mold 1. In particular, if the holder 20, the retaining piece 30, the sliding piece 50 and the molding core 60 are formed as one unit, mounting to the forming mold 1 is further facilitated.

Figure 6:
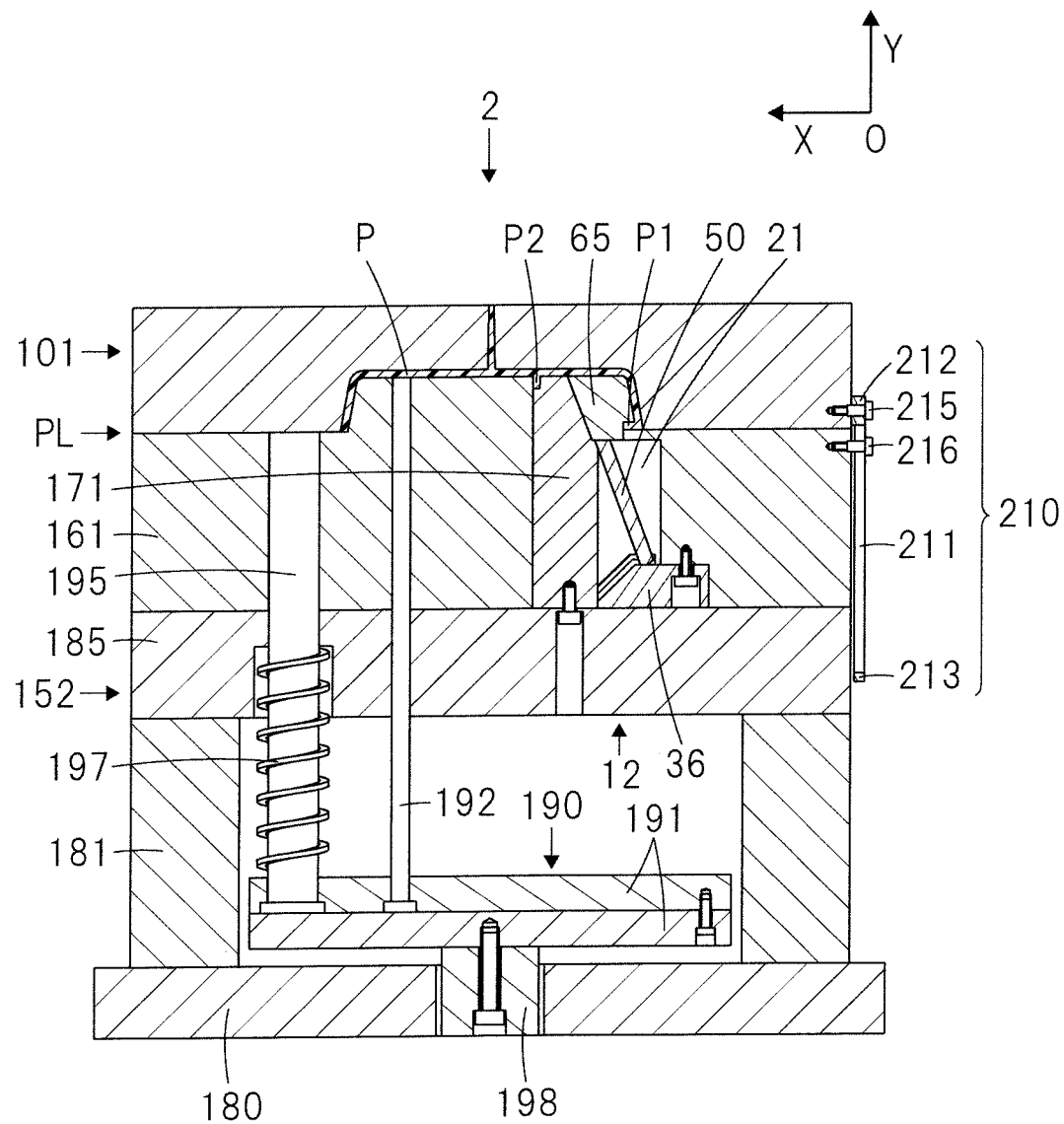
FIG. 6 is a sectional view of a forming mold 2 according to the second embodiment of the present invention at the time of mold clamping.
Figure 7:
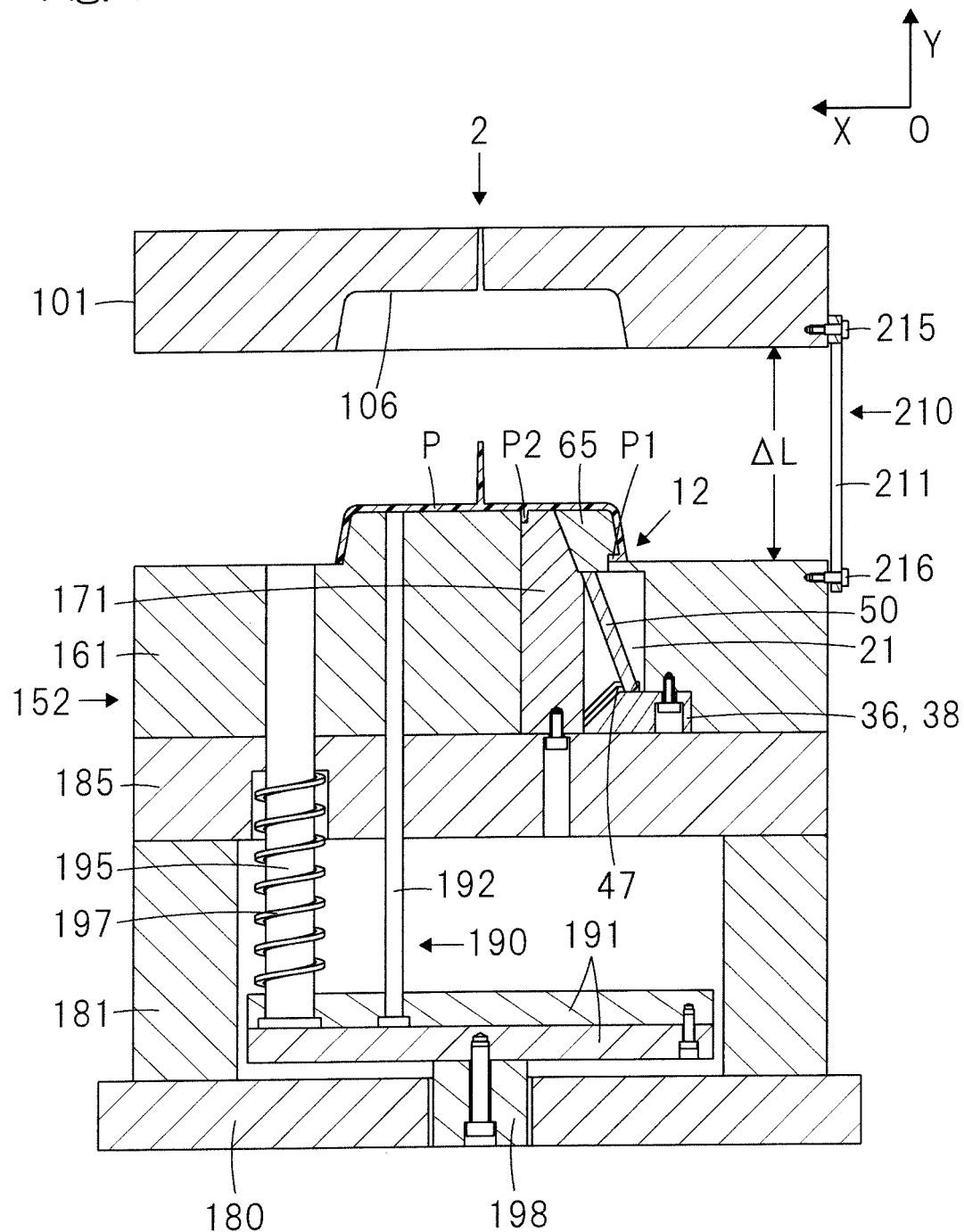
FIG. 7 is a sectional view of the forming mold 2 according to the second embodiment of the present invention at the time of mold opening.
Figure 8:
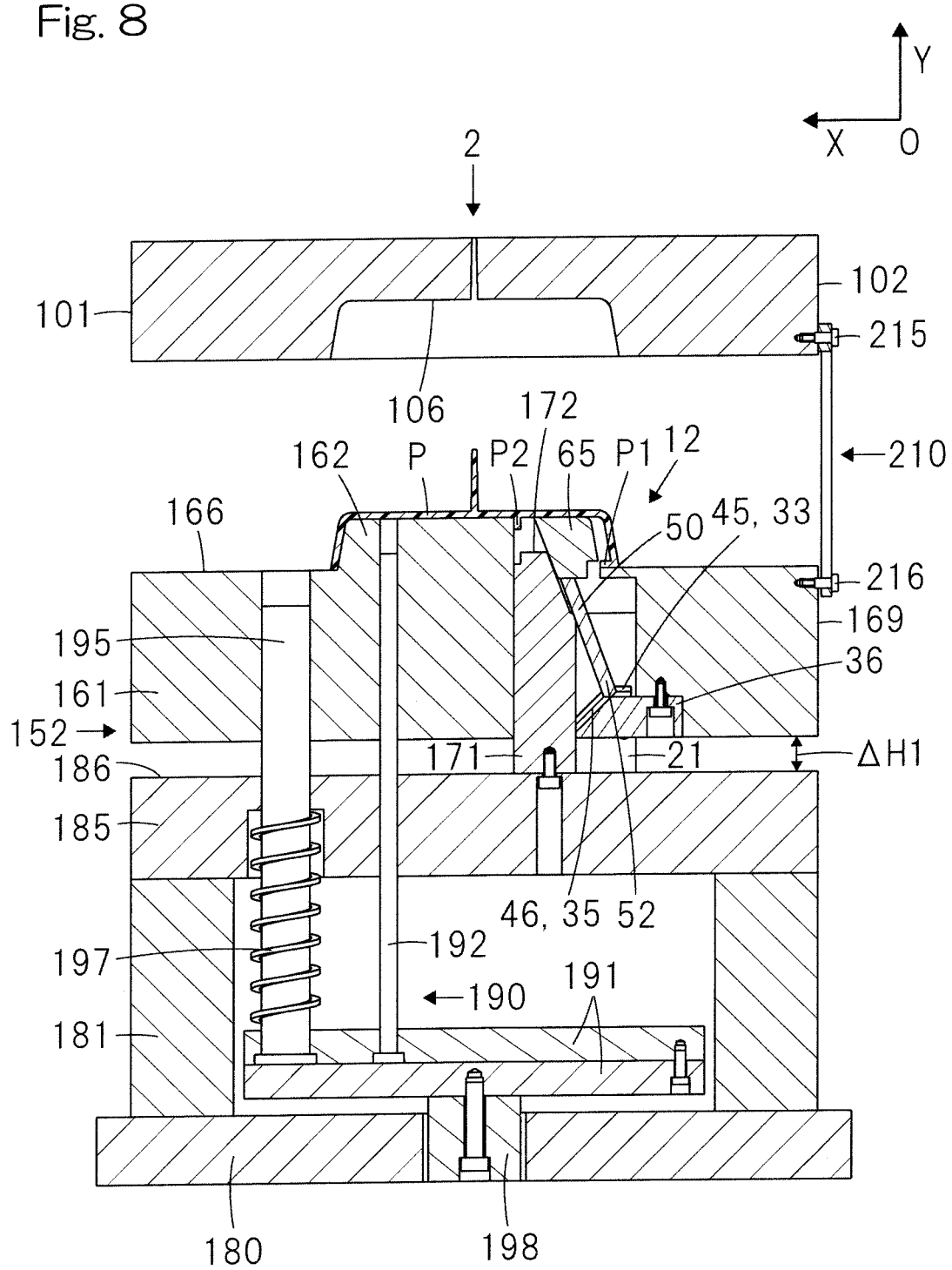
FIG. 8 is a sectional view of the forming mold 2 according to the second embodiment of the present invention during a pull-off operation for an undercut.
Figure 9:
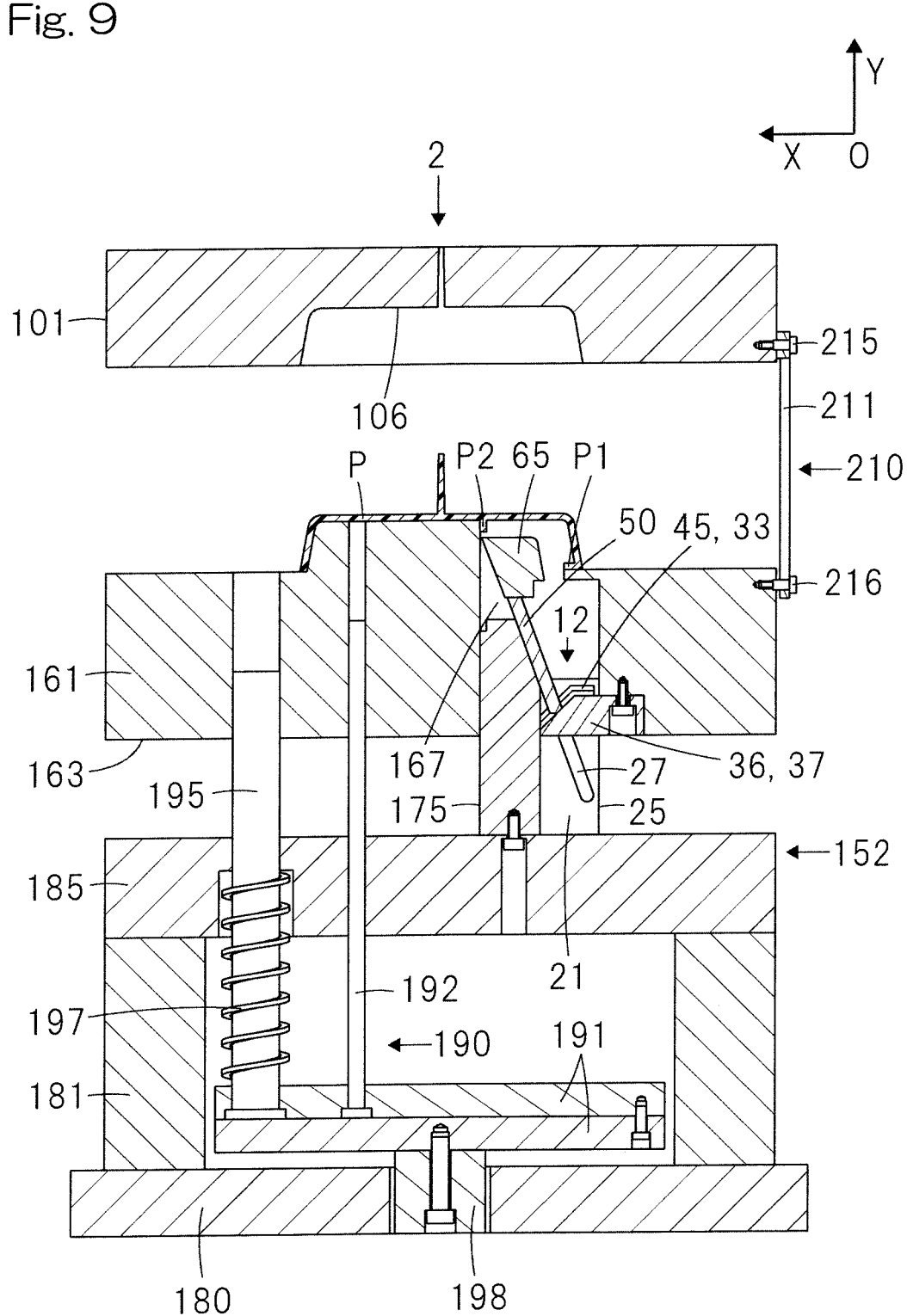
FIG. 9 is a sectional view of the forming mold 2 according to the second embodiment of the present invention before ejection of a molded product P.
Figure 10:
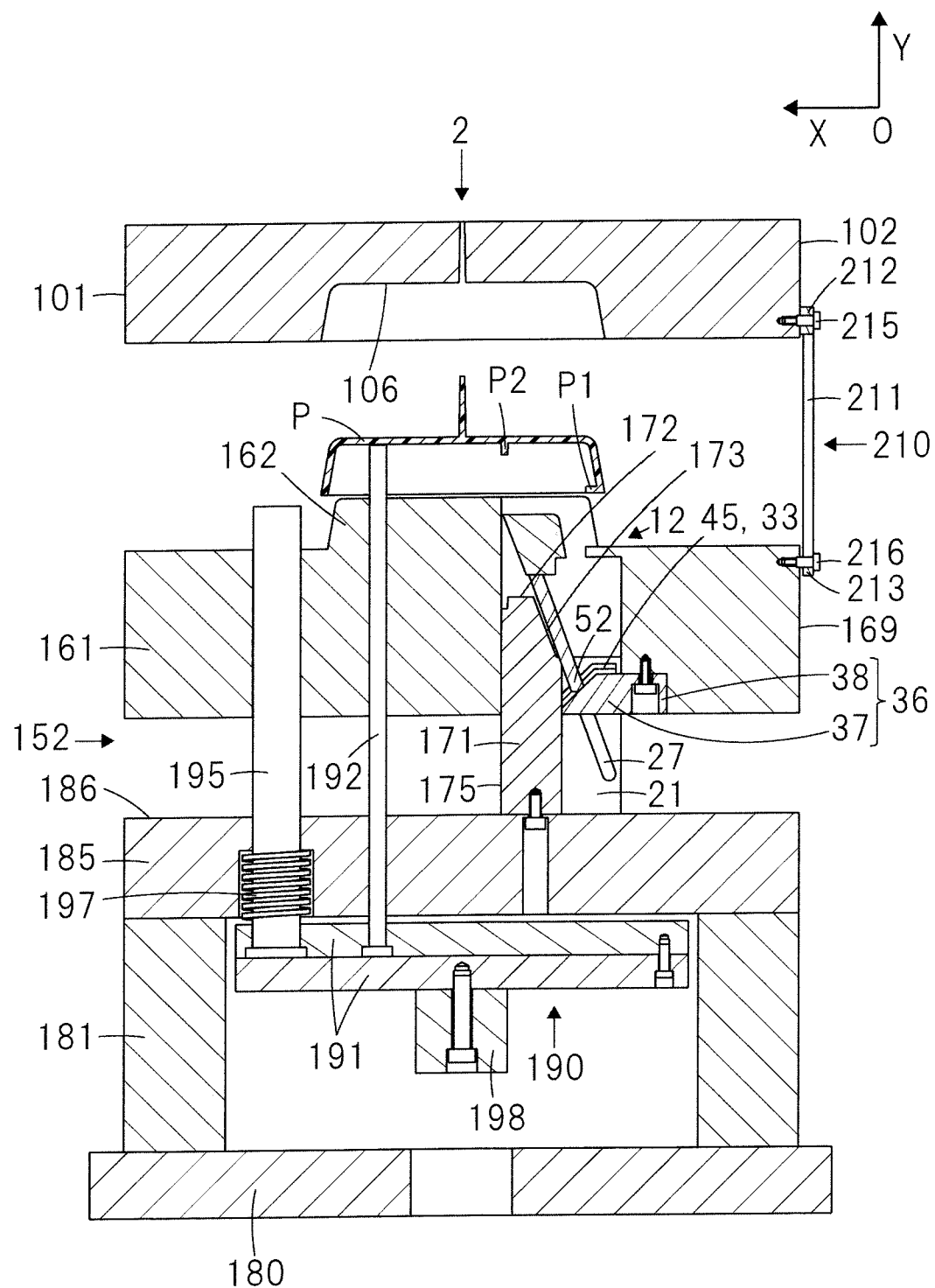
FIG. 10 is a sectional view of the forming mold 2 according to the second embodiment of the present invention during an operation of ejecting the molded product P.

FIG. 6 and FIG. 7 are sectional views of a forming mold 2 according to the second embodiment of the present invention, at the time of mold clamping and after mold opening. FIG. 8 is a sectional view of the forming mold 2 during a pull-off operation for an undercut. FIG. 9 is a sectional view of the forming mold 2 before ejection of a molded product P. FIG. 10 is a sectional view of the forming mold 2 during an operation of ejecting the molded product P. The same components as those of the forming mold 1 according to the first embodiment of the present invention shown in FIG. 1 to FIG. 5 are denoted by the same reference characters, and the description thereof is omitted.

As in the forming mold 1 of the first embodiment, the forming mold 2 of the second embodiment includes: a fixed die 101 for forming the outer surface side of the molded product P; a movable die 152 for forming the inner surface side of the molded product P; and an undercut processing mechanism 12. In the present embodiment, the molded product P is the same as that in the first embodiment, including the undercut portion P1. For convenience sake, the fixed die 101 side in FIG. 6 is defined as upper side and the movable die 152 side is defined as lower side. In addition, in the following description, a left side refers to the left side in FIG. 6, and a right side refers to the side opposite thereto, unless otherwise specified.

The basic configuration of the undercut processing mechanism 12 of the second embodiment is the same as that of the undercut processing mechanism 11 of the first embodiment, but the mounting manner of the holder 21 and the like are different in relation to a driving mechanism for the undercut processing mechanism 12. The undercut processing mechanism 11 of the first embodiment performs a pull-off operation for the undercut portion P1, using the ejector mechanism 190 as a drive source, in synchronization with the ejector mechanism 190. In contrast, the undercut processing mechanism 12 of the second embodiment performs a pull-off operation for the undercut portion P1 in conjunction with a mold opening operation.

As in the movable die 151 of the first embodiment, the movable die 152 includes: a movable-side die plate 161 having a core 162 for forming the inner surface side of the molded product P; a movable-side attachment plate 180; a spacer block 181; two ejector base plates 191; an ejector pin 192; a return pin 195; a spring 197; and an ejector rod 198.

The movable die 152 has the ejector mechanism 190 including the ejector base plate 191, the ejector pin 192, the ejector rod 198 and the like, and further includes: a second molding core 171 for forming the inner surface side of the molded product P; and a movable-side receiving plate 185.

The second molding core 171 has an upper surface 172 as a molding surface, and serves to form the inner surface of the molded product P, together with the core 162 provided to the movable-side die plate 161 and a first molding core 65 provided to the undercut processing mechanism 12. Also, the second molding core 171 serves to form the protruding portion P2 of the molded product P. The first molding core 65 is the same as the molding core 60 in the first embodiment.

The second molding core 171 has a molding surface at the upper surface 172, and an upper right side surface 173 thereof is formed to be a slope surface matched with the shape of the first molding core 65 of the undercut processing mechanism 12. In a mold clamped state, the first molding core 65 of the undercut processing mechanism 12 is in slidable contact with the upper right side surface 173.

The second molding core 171 is formed integrally with the holder 21, and is slidably accommodated or housed in a housing portion 167 provided in the movable-side die plate 161. The second molding core 171 has a lower end fixed to the upper surface 186 of the movable-side receiving plate 185, and moves integrally with the movable-side receiving plate 185, and has a left side surface 175 in slidable contact with the movable-side die plate 161.

The configuration of the holder 21 is basically the same as the holder 20 in the first embodiment, but the holder 21 is provided adjacently at the right of the second molding core 171 and integrally with the second molding core 171, and moves integrally with the second molding core 171 and the movable-side receiving plate 185. A right side surface 25 of the holder 21 is opened so that a retaining piece 36 is fitted therein.

The retaining piece 36 has the same protrusions 45, 46 and connection portion 47 as the retaining piece 30 in the first embodiment, and is mounted such that the bottom surface of the retaining piece 36 is flush with a bottom surface 163 of the movable-side die plate 161. The retaining piece 36 includes: a retaining portion 37 which has the protrusions 45, 46 and which is located in the holder 21 and engaged with the sliding piece 50; and a fixing portion 38 located outside the holder 21. The configuration of the retaining portion 37 is basically the same as that of the retaining piece 30 in the first embodiment. The fixing portion 38 is provided for fixing the retaining piece 36 to the movable-side die plate 161. The fixing portion 38 is contiguous to the retaining portion 37, and the retaining portion 37 and the fixing portion 38 are formed integrally.

The movable-side receiving plate 185 is a thick planar plate and is located between the movable-side die plate 161 and the spacer block 181. The movable-side receiving plate 185 is connected with the spacer block 181 and reinforces the movable-side die plate 161, and also functions as a fixing plate and a support plate for the second molding core 171 and the holder 21. The movable-side receiving plate 185 is not fixed to the movable-side die plate 161 and can be separated therefrom.

The forming mold 2 has a separation distance restrictor 210 for restricting a separation distance of the movable-side die plate 161 from the fixed die 101. The separation distance restrictor 210 includes a bar member 211 and two engagement bodies 215, 216 through which the bar member 211 is inserted. The bar member 211 has, at both ends, stoppers 212, 213 that do not allow the engagement bodies 215, 216 to pass therethrough. The engagement bodies 215, 216 have, at centers, through holes through which the bar member 211 can be inserted. It is noted that the separation distance restrictor 210 is not limited to this configuration.

The engagement body 215 and the engagement body 216, with the bar member 211 inserted therethrough, are fixed to a right side surface 102 of the fixed die 101 and a right side surface 169 of the movable-side die plate 161, respectively. It is noted that the engagement body 215 and the engagement body 216 may be attached to a left side surface of the fixed die 101 and a left side surface of the movable-side die plate 161, respectively, or may be attached to both side surfaces of the fixed die 101 and the movable-side die plate 161.

In a mold clamped state, the bar member 211 is suspended with the upper stopper 212 engaged with the engagement body 215. When mold opening is started, the movable die 152 is lowered so that the engagement body 216 attached to the movable-side die plate 161 comes into contact with the lower stopper 213 of the bar member 211. Thus, the movable-side die plate 161 is inhibited from being lowered and cannot be lowered any more.

The operation and action of the forming mold 2 will be described with reference to an example in which the molded product P is formed by injection molding in the forming mold 2. During molding of the molded product P, the upper surface 186 of the movable-side receiving plate 185 is in close contact with the bottom surface 163 of the movable-side die plate 161, and the second molding core 171 and the holder 21 are all housed in the housing portion 167. Thus, the first molding core 65 is located so as to form the undercut portion P1 of the molded product P, and the second molding core 171 is located so as to form an inner surface of the molded product P and the protruding portion P2.

In the forming mold 2, parting surfaces (PL surfaces) of the fixed die 101 and the movable die 152 are fitted to each other, and a melted material is injected to mold the molded product P (see FIG. 6). After the molding step and the cooling step are finished, mold opening is performed in the following manner. The mold opening is performed through two steps, i.e., a first step of opening the parting surfaces PL and a second step of separating the movable-side die plate 161 and the movable-side receiving plate 185 from each other.

After the cooling step is finished, the movable die 152 is retracted relative to the fixed die 101, whereby the parting surfaces (PL surfaces) are opened. In the first step of mold opening, the entire movable die 152 is retracted relative to the fixed die 101 (see FIG. 7). Until the movable die 152 reaches a distance ΔL prescribed by the separation distance restrictor 210, the entire movable die 152 is lowered integrally, and therefore, the undercut processing mechanism 12 makes no movements.

Also after the movable die 152 reaches the distance ΔL prescribed by the separation distance restrictor 210, the movable die 152 continues being retracted but the movable-side die plate 161 is inhibited from being retracted, by the separation distance restrictor 210. Therefore, in the movable die 152, after reaching the distance ΔL prescribed by the separation distance restrictor 210, the movable-side receiving plate 185 and the like are retracted (see FIG. 8).

In the second step of mold opening in which the movable-side receiving plate 185 and the like are retracted, the movable-side receiving plate 185 is retracted relative to the movable-side die plate 161, and then, the interval therebetween is gradually expanded (see FIG. 8). When the movable-side receiving plate 185 is retracted relative to the movable-side die plate 161, the second molding core 171 and the holder 21 mounted to the movable-side receiving plate 185 are also retracted.

Meanwhile, since the retaining piece 36 is fixed to the movable-side die plate 161, and the sliding piece 50 is engaged with the retaining piece 36. Therefore, the sliding piece 50 moves along the oblique grooves 27 of the holder 21 from the molding position shown in FIG. 6, as the holder 21 moves in the −Y direction. At this time, the second molding core 171 is also retracted. Therefore, the first molding core 65 moves in both of the Y direction and the X direction as seen from the holder 21, without colliding with the second molding core 171, whereby the first molding core 65 protrudes out of the holder 21 and moves away from the undercut portion P1.

When the movable-side receiving plate 185 is retracted by ΔH1 from the movable-side die plate 161, the first molding core 65 connected with the sliding piece 50 moves by ΔL1 in the X direction, so as to be completely detached from the undercut portion P1 (see FIG. 8). The length L1 of the protrusion 45 is the same as ΔL1. Accordingly, when the movable-side receiving plate 185 is retracted by ΔH1 from the movable-side die plate 161, the lower end 52 of the sliding piece 50 is located at the left end of the protrusion 45. When the movable-side receiving plate 185 is further retracted from the movable-side die plate 161 beyond ΔH1, the first molding core 65 moves obliquely downward by being guided by the protrusion 46 and passes under the protruding portion P2 (see FIG. 9).

After the mold opening is completely finished, the ejection step for the molded product P is to be performed. In the ejection step, the undercut portion P1 has been already detached, and the ejector mechanism 190 is operated so that the ejector base plate 191 is lifted and the ejector pin 192 attached to the ejector base plate 191 ejects the molded product P (see FIG. 10).

After the molded product P is extracted, the forming mold 2 is clamped again in order to mold the next molded product P. The operation of the forming mold 2 from the mold opened state to the mold clamped state is performed in the order opposite to the above operation.

The actions and effects of the forming mold 2 of the second embodiment are basically the same as the actions and effects of the forming mold 1 of the first embodiment. Although the forming mold 1 of the first embodiment and the forming mold 2 of the second embodiment are different in arrangements and the like of the holders and the drive sources for the undercut processing mechanisms 11, 12, the ejector mechanism 190 performs a one-stage ejection operation in both forming molds 1 and 2, and the undercut processing mechanism and the forming mold can be made compact. In addition, the undercut processing mechanism 12 can be unitized.

In the forming mold 2 and the undercut processing mechanism 12 of the second embodiment, the first molding core 65 is moved so as to be pulled off from the undercut portion P1, and then, the first molding core 65 is further moved away from the molded product P. Thereafter, the molded product P is ejected. Therefore, it is possible to easily and assuredly demold the molded product P even if the molded product P has a protruding portion located at a pull-off-direction side from the undercut portion P1.

Figure 11:
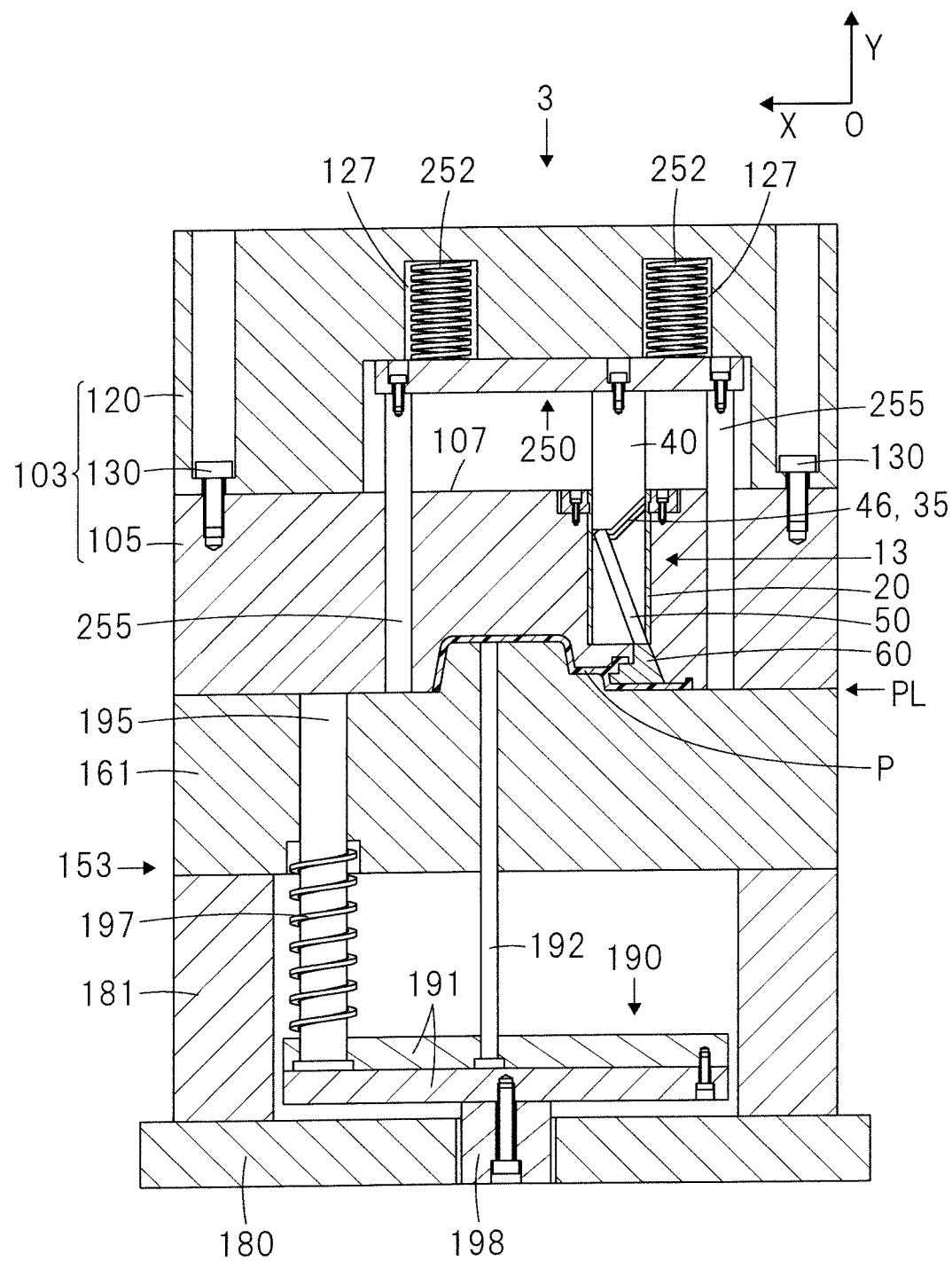
FIG. 11 is a sectional view of a forming mold 3 according to the third embodiment of the present invention at the time of mold clamping.
Figure 12:
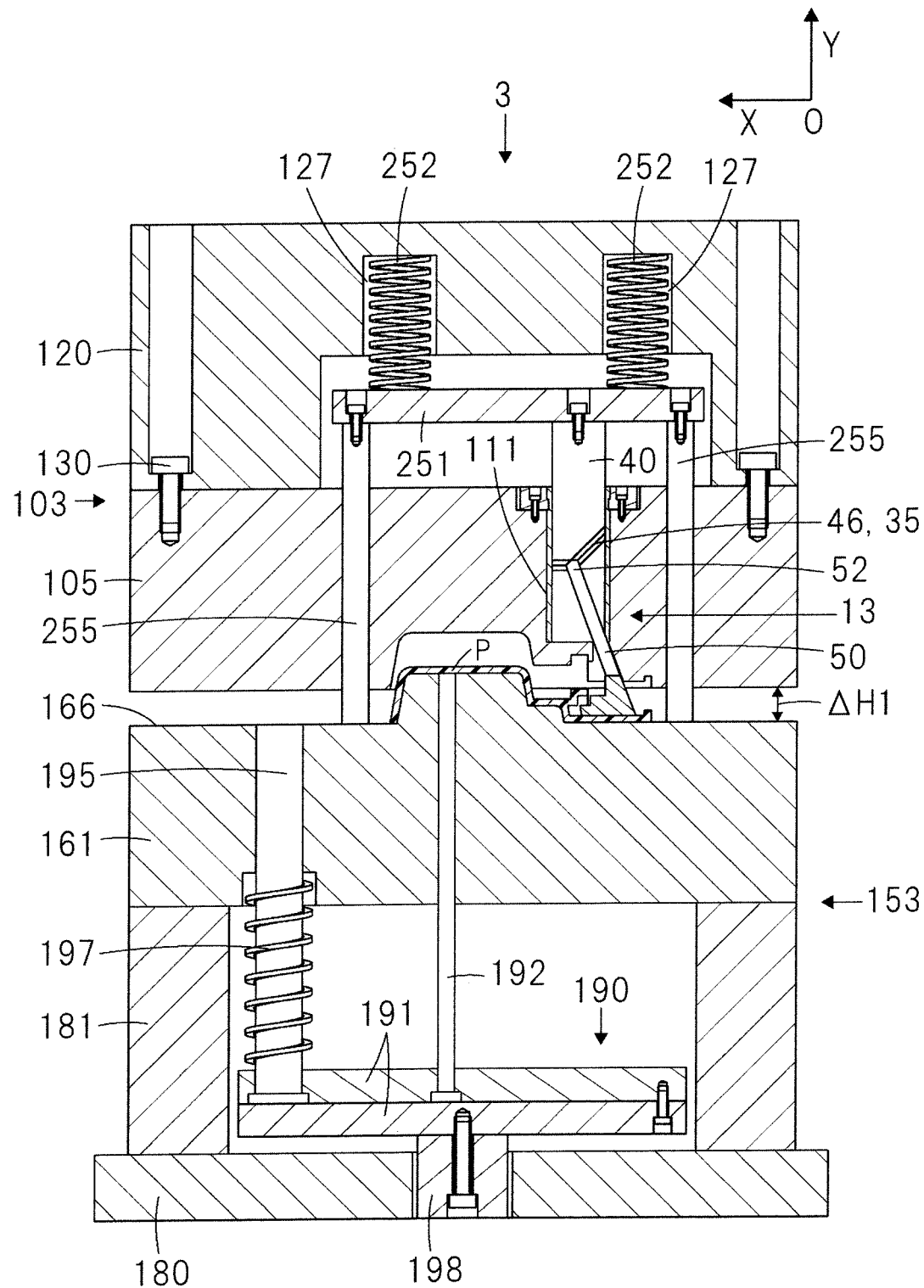
FIG. 12 is a sectional view of the forming mold 3 according to the third embodiment of the present invention during mold opening.
Figure 13:
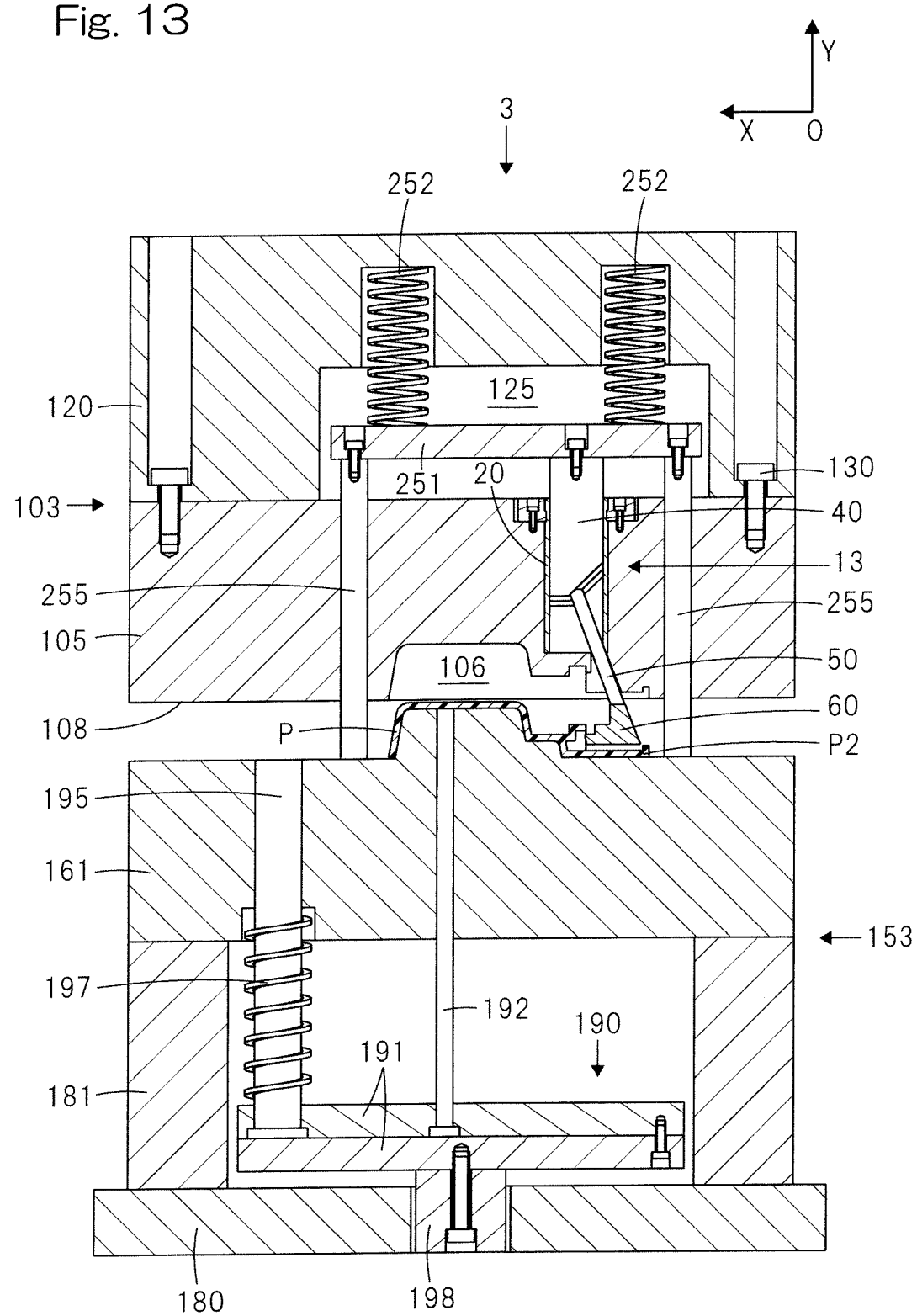
FIG. 13 is a sectional view of the forming mold 3 according to the third embodiment of the present invention during mold opening.
Figure 14:
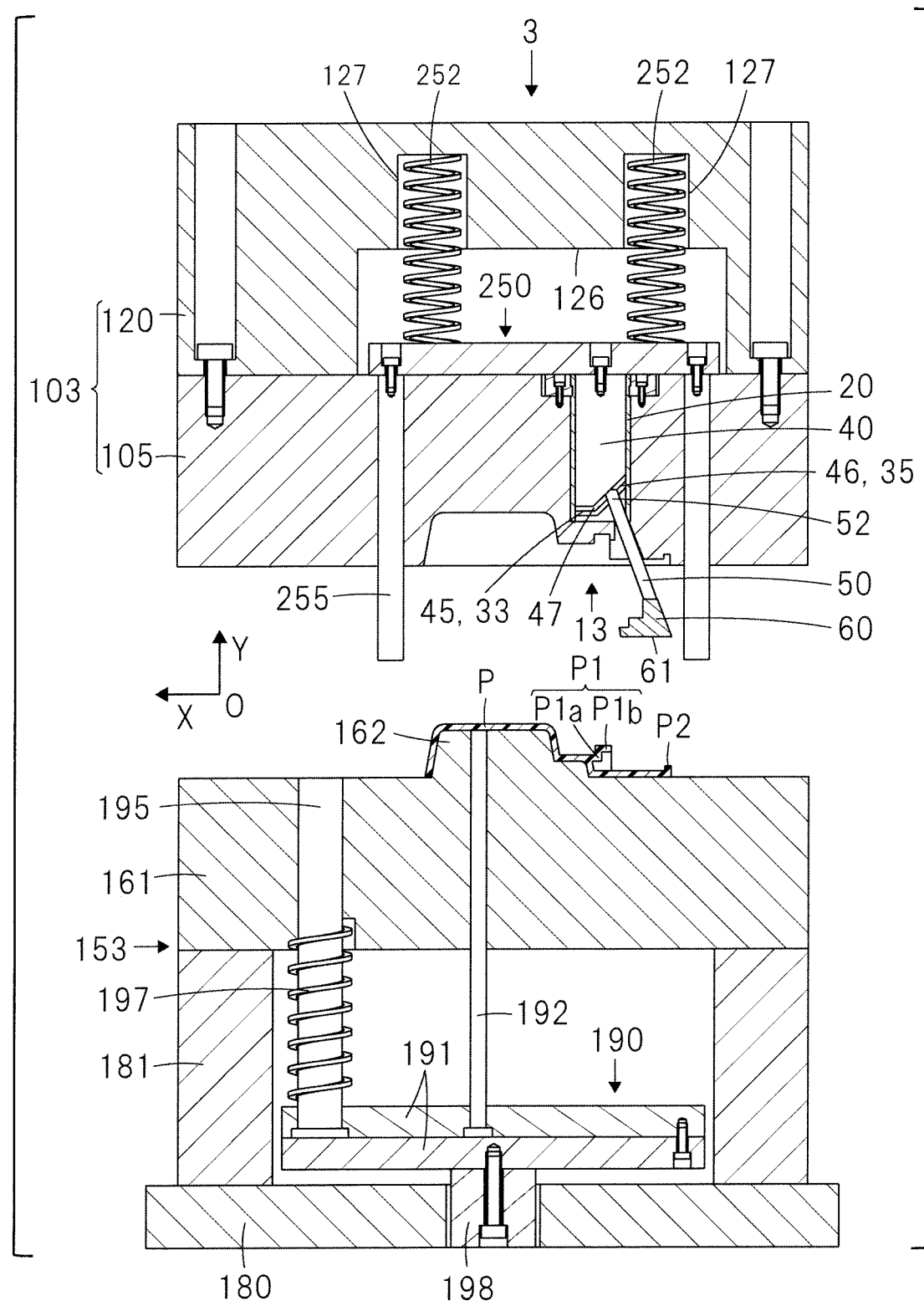
FIG. 14 is a sectional view of the forming mold 3 according to the third embodiment of the present invention before ejection of the molded product P.
Figure 15:
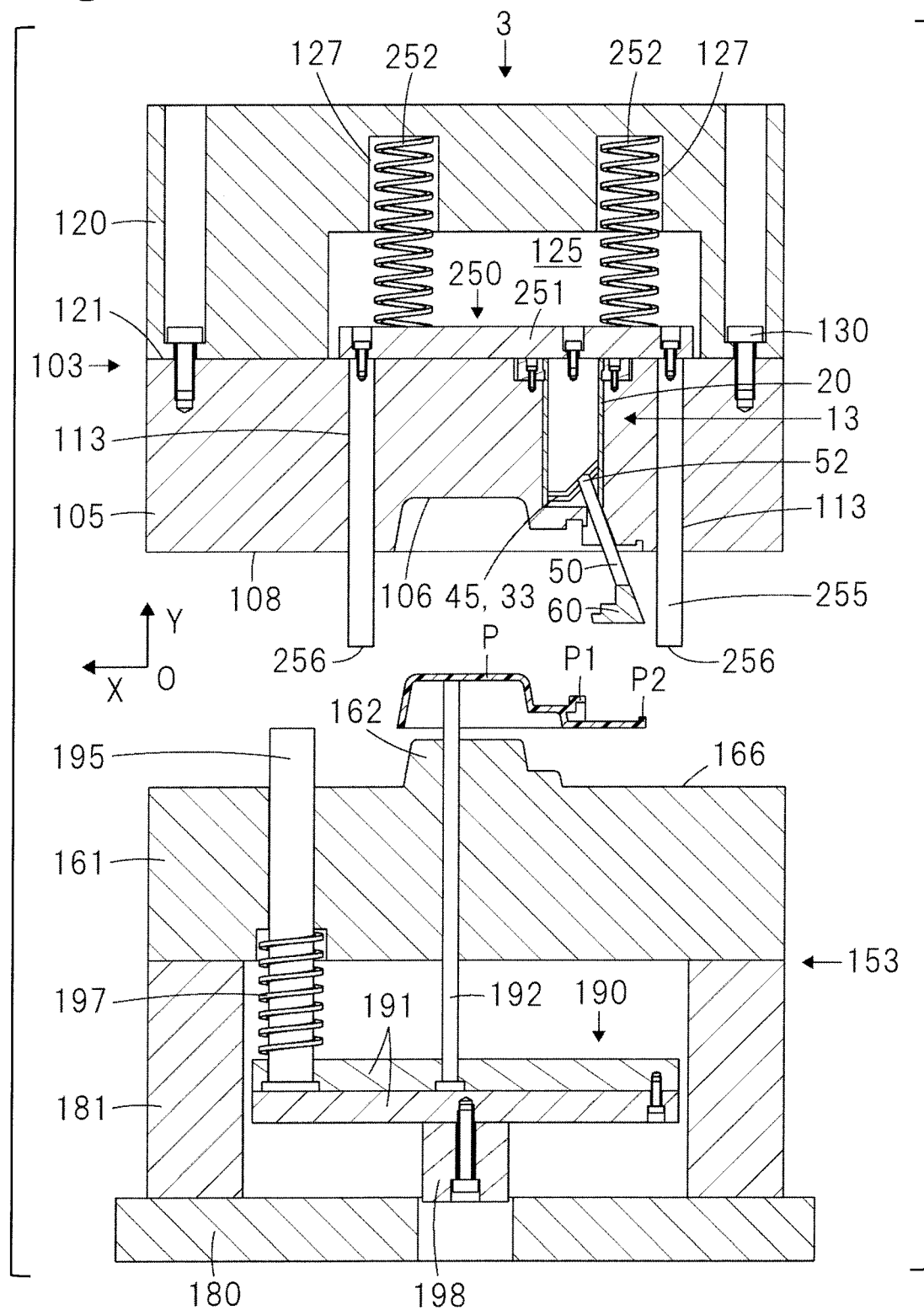
FIG. 15 is a sectional view of the forming mold 3 according to the third embodiment of the present invention during an operation of ejecting the molded product P.

FIG. 11 is a sectional view of a forming mold 3 according to the third embodiment of the present invention at the time of mold clamping. FIG. 12 and FIG. 13 are sectional views of the forming mold 3 during mold opening. FIG. 14 is a sectional view of the forming mold 3 before ejection of the molded product P. FIG. 15 is a sectional view of the forming mold 3 during an operation of ejecting the molded product P. The same components as those of the forming mold 1 according to the first embodiment of the present invention shown in FIG. 1 to FIG. 5 are denoted by the same reference characters, and the description thereof is omitted.

As in the forming mold 1 of the first embodiment, the forming mold 3 includes: a fixed die 103 for forming the outer surface side of the molded product P; a movable die 153 for forming the inner surface side of the molded product P; and an undercut processing mechanism 13. For convenience sake, the fixed die 103 side in FIG. 11 is defined as upper side and the movable die 153 side is defined as lower side. In addition, in the following description, a left side refers to the left side in FIG. 11, and a right side refers to the side opposite thereto, unless otherwise specified.

As in the molded product P shown in the first and second embodiments, the molded product P in the present embodiment has an undercut portion P1 and further has a protruding portion P2 located at a pull-off-direction (−X direction) side from the undercut portion P1. However, as compared to the molded product P shown in the first and second embodiments, the form of the molded product P and the positions and the forms of the undercut portion P1 and the protruding portion P2 are different. Specifically, the undercut portion P1 in the present embodiment has a stepped shape on the inner side, and has a part P1$a$ extending in the −X direction and a part P1$b$ positioned on the upper side of the part P1$a$ and extending in the −X direction (see FIG. 14).

The fixed die 103 includes: a fixed-side die plate 105 having a cavity 106 for forming the outer surface side of the molded product P; and a fixed-side attachment plate 120. The fixed-side die plate 105 and the fixed-side attachment plate 120 are connected with each other by fastening bolts 130. The fixed-side attachment plate 120 has a housing portion 125 in which an undercut driving mechanism 250 is accommodated or housed.

The configuration of the movable die 153 is basically the same as the movable die 151 in the first embodiment. However, unlike the movable die 151, the holder 20 constituting the undercut processing mechanism 13 is not mounted to the movable die 153, and therefore, the movable die 153 does not have the recess 164 and does not have a through hole through which the ejection pin 200 is inserted.

The configuration of the undercut processing mechanism 13 is basically the same as the undercut processing mechanism 11 of the first embodiment. However, the undercut processing mechanism 13 of the third embodiment and the undercut processing mechanism 11 of the first embodiment are provided at different positions. The undercut processing mechanism 11 of the first embodiment is provided in the movable die 151, whereas the undercut processing mechanism 13 of the third embodiment is provided in the fixed die 103. Therefore, the holder 20, a retaining piece 40, the sliding piece 50 and the molding core 60 are inverted in the up-down direction as compared to the undercut processing mechanism 11 of the first embodiment.

In the undercut processing mechanism 13, the holder 20 is fitted and fixed in a recess 111 provided so as to face the upper surface 107 side of the fixed-side die plate 105. The holder 20 accommodates or houses the retaining piece 40 on the upper side and the sliding piece 50 on the lower side, which are housed so that the molding core 60 forms a part of the molded product P including the undercut portion P1 in a die closed state.

The basic function required of the undercut processing mechanism 13 is the same as those of the undercut processing mechanisms 11 and 12. However, since the shape of the undercut portion P1 of the third embodiment is different from the undercut portion P1 in the first and second embodiments, the function and action of protrusions 45, 46 provided to the retaining piece 40 in the third embodiment are somewhat different from those of the protrusions 45, 46 in the first and second embodiments.

The retaining piece 40 of the present embodiment has a longer body than the retaining piece 30 of the previous embodiment, and the proximal end thereof is directly fixed to a driving plate 251. However, the retaining piece 40 has, at the distal end, the same protrusions 45, 46 as those of the retaining piece 30, and is slidably accommodated or housed in the holder 20. Thus, the basic function of the retaining piece 40 is the same as that of the retaining piece 30. As the retaining piece 40, the retaining piece 30 and the ejection pin 200 may be provided as in the first embodiment and the ejection pin 200 may be fixed to the driving plate 251.

The retaining piece 40 is inverted in the up-down direction as compared to the retaining piece 30 in the first embodiment. Therefore, the protrusion 46 has an ascending slope such that a distal end of the protrusion 46, as seen from the connection portion 47, is positioned between the −X direction and the Y direction. The functions of the protrusions 45, 46 provided to the retaining piece 40 are, taken as a whole, the same as those of the protrusions 45, 46 of the retaining piece 30, but the individual function and action of each of the protrusion 45 and the protrusion 46 are somewhat different from those of the protrusions 45, 46 of the retaining piece 30.

The protrusion 45 of the retaining piece 30 in the first embodiment is provided so as to allow complete detachment from the undercut portion P1. On the other hand, with the protrusion 45 of the retaining piece 40 in the present embodiment, detachment from the part P1$a$ of the undercut portion P1 can be performed, but detachment from the part P1$b$ cannot be performed. That is, with the protrusion 45 alone, complete detachment from the undercut portion P1 cannot be performed (see FIG. 12).

In the case of the retaining piece 30 of the first embodiment, the lower end 52 of the sliding piece 50 transfers to the protrusion 46 in a state in which the molding core 60 has been completely detached from the undercut portion P1. That is, in the retaining piece 30 of the first embodiment, the protrusion 46 is not required to have a function and an action for performing detachment from the undercut portion P1. On the other hand, in the case of the protrusion 46 of the retaining piece 40 in the present embodiment, detachment from the undercut P1 is not completely finished at the time when the lower end 52 of the sliding piece 50 transfers to the protrusion 46. Therefore, the protrusion 46 is required to have not only a function of moving the molding core 60 away from the molded product P but also a function and an action of performing detachment from the undercut portion P1, and is formed, accordingly, to realize such a function and an action.

Further, the undercut processing mechanism 13 and the undercut processing mechanism 11 are different from each other in their drive sources for pulling off the undercut portion P1. In the forming mold 1 of the first embodiment, the ejector mechanism 190 is used as a drive source for pulling off the undercut portion P1. On the other hand, the forming mold 3 of the third embodiment is provided with a dedicated undercut driving mechanism 250 for pulling off the undercut portion P1.

The undercut driving mechanism 250 includes a driving plate 251 with which the retaining piece 40 is connected, and driving springs 252 for advancing/retracting the driving plate 251, and the undercut driving mechanism 250 is mounted to a housing portion 125 provided in the fixed-side attachment plate 120. The housing portion 125 is a recess provided so as to face a lower surface 121 side of the movable-side attachment plate 120. A ceiling surface 126 of the housing portion 125 has spring housing portions 127 formed in a recessed shape for housing the driving springs 252.

On the lower surface of the driving plate 251, the retaining piece 40 is attached with the protrusions 45, 46 set on the downward side, and return pins 255 are attached at both sides of the holder 20. The return pins 255 are slidably inserted into through holes 113 provided in the fixed-side die plate 105. When the mold is opened, tip ends 256 of the return pins 255 protrude from a lower surface 108 of the fixed-side die plate 105. When the mold is closed, the return pins 255 act so as to push up the driving plate 251. The driving springs 252 are housed in the spring housing portion 127, and biases or energize the driving plate 251 so as to push the driving plate 251 in the direction toward the movable die 153.

The operation and action of the forming mold 3 will be described with reference to an example in which the molded product P is formed by injection molding in the forming mold 3. During molding of the molded product P, parting surfaces (PL surfaces) of the fixed die 103 and the movable die 153 are closed. Accordingly, in the undercut driving mechanism 250, the tip ends 256 of the return pins 255 are in contact with the upper surface 166 of the movable-side die plate 161, and the driving springs 252 are in a contracted state. In a mold closed state, the molding core 60 is located so as to form the undercut portion P1 of the molded product P (see FIG. 11).

In the forming mold 3, parting surfaces (PL surfaces) of the fixed die 103 and the movable die 153 are fitted to each other, and a melted material is injected to mold the molded product P. After the molding step and the cooling step are finished, the movable die 153 is lowered to perform mold opening. In conjunction with this, the undercut driving mechanism 250 operates so that the undercut portion P1 is pulled off. Hereinafter, the operations of the undercut processing mechanism 13 and the undercut driving mechanism 250 will be described in detail.

As the mold is opened, the driving springs 252 extend to push the driving plate 251 downward (−Y direction). At this time, the tip ends 256 of the return pins are in contact with the upper surface 166 of the movable-side die plate 161, and the driving plate 251 is lowered in synchronization with mold opening. Since the retaining piece 40 is connected with the driving plate 251, the retaining piece 40 is lowered integrally with the driving plate 251.

As the retaining piece 40 housed in the holder 20 moves in the −Y direction, the sliding piece 50 having the dovetail groove engaged with the protrusion 45 of the retaining piece 40 moves along the oblique grooves 27 of the holder 20 from the molding position shown in FIG. 11. Thus, the molding core 60 moves in both of the −Y direction and the −X direction so as to move away from the undercut portion P1.

While the movable die 153 is lowered by ΔH1 relative to the fixed die 103, the sliding piece 50 is pushed by the retaining piece 40, whereby the sliding piece 50 is lowered by ΔH1 and moves by ΔL1 in the −X direction along the protrusion 45 of the retaining piece 40. The molding core 60 connected with the sliding piece 50 also moves by ΔH1 in the −Y direction and by ΔL1 in the −X direction, so as to be detached from the part P1$_a$ of the undercut portion P1 (see FIG. 12).

The length L1 of the protrusion 45 is the same as ΔL1. Accordingly, when the movable die 153 is lowered by ΔH1 relative to the fixed die 103, the lower end 52 of the sliding piece 50 is located at the right end of the protrusion 45. At this point of time, the molded product P cannot be extracted (see FIG. 12). Then, the movable die 153 is further lowered. Along with this, the retaining piece 40 continues being pushed by the driving plate 251. Meanwhile, the lower end 52 of the sliding piece 50 transfers from the protrusion 45 to the protrusion 46 of the retaining piece 40 and moves along the protrusion 46, to perform detachment from the part P1$b$ of the undercut portion P1.

Since the protrusion 46 has an ascending slope, the lowering amount thereof is smaller than the lowering amount of the retaining piece 40. Therefore, when the lower end 52 of the sliding piece 50 moves on the protrusion 46, the sliding piece 50 moves in both of the −Y direction and the −X direction along the oblique grooves 27, but the movement amount thereof is smaller than that when the lower end 52 of the sliding piece 50 moves on the protrusion 45.

That is, when the movable die 153 is further lowered beyond ΔH1, the interval between the end surface 61 of the molding core 60 and the inner surface of the molded product P is expanded with the lowering. Thus, even when the movable die 153 is further lowered beyond ΔH1 and the molding core 60 moves in the −X direction, the molding core 60 passes above the protruding portion P2 (see FIG. 13 and FIG. 14). In this way, the molding core 60 can be moved to a position that allows the molded product P to be extracted, without the molding core 60 colliding with the protruding portion P2 (see FIG. 14).

After mold opening is completed (see FIG. 14), the ejector mechanism 190 operates so that the ejector pin 192 ejects the molded product P so as to allow the molded product P to be extracted (see FIG. 15).

After the molded product P is extracted, the forming mold 3 is clamped again through an operation opposite to the above operation of the forming mold 3 and the undercut processing mechanism 13, in order to mold the next molded product P.

The functions and effects of the forming mold 3 of the third embodiment are basically the same as the functions and effects of the forming mold 1 of the first embodiment. Although the forming mold 1 of the first embodiment and the forming mold 3 of the third embodiment are different in arrangements of the holders and the drive sources for the undercut processing mechanisms 11, 13, the ejector mechanism 190 performs a one-stage ejection operation in both forming molds 1 and 3, and the undercut processing mechanism and the forming mold can be made compact. In addition, the undercut processing mechanism 13 can be, also, unitized.

The forming mold 3 and the undercut processing mechanism 13 of the third embodiment have the following feature: the protrusion 45 forming the first engagement element guides the sliding piece 50 so that the molding core 60 is partially detached from the undercut portion P1; and the protrusion 46 forming the second engagement element guides the sliding piece 50 so that the molding core 60 in a process of being detached from the undercut portion P1 continues being detached from the undercut portion P1 and moves away from the molded product P.

However, from an overall perspective, the molding core 60 is moved so as to be detached from the undercut portion P1, and then, the molding core 60 is further moved away from the molded product P. In view of this, the forming mold 3 and the undercut processing mechanism 13 of the third embodiment is the same as the forming molds 1, 2 and the undercut processing mechanisms 11, 12 of the first and second embodiments. In the forming molds 1, 2 and the undercut processing mechanisms 11, 12 of the first and second embodiments, the first engagement element and the second engagement element may be configured as in the forming mold 3 and the undercut processing mechanism 13 of the third embodiment, depending on the form of the undercut portion P1.

According to the undercut processing mechanism, the forming mold, and the molded product of the present invention described above with reference to the forming molds 1, 2, 3 of the first to third embodiments, the undercut processing mechanism of the present invention can be incorporated into the movable dies 151, 152 and can be also incorporated into the fixed die 103. Further, as the driving mechanism and the driving source for the undercut processing mechanism, various types are applicable. Therefore, it is possible to select and use an appropriate type in accordance with the usage purpose of the forming mold, and thus usability is improved.

The undercut processing mechanism, the forming mold and the molded product of the present invention are not limited to the above embodiments, but may be modified within a range that does not deviate from the gist. For example, in the first to third embodiments, the protrusion 45 and the protrusion 46 are provided to the retaining piece 30, and the dovetail groove is provided to the lower end 52 of the sliding piece 50. However, a dovetail groove as substitute for the protrusion 45 and the protrusion 46 may be provided to the retaining piece 30, and a protrusion to be slidably fitted to the dovetail groove may be provided to the lower end 52 of the sliding piece 50.

In the above embodiments, the protrusion 46, forming the second engagement element provided to the retaining piece 30, 36, 40, is formed in a linear shape. However, the protrusion 46 may be curved. It suffices that the second engagement element is contiguous to the first engagement element and can guide the sliding piece 50 so that the molding core 60 completely detached from the undercut portion P1 moves away from the molded product P or so that the molding core 60 partially detached from the undercut portion P1 continues being detached from the undercut portion P1 and moves away from the molded product P.

In the above embodiment, the oblique grooves 27 are provided to the holder 20, and the sliding piece 50 is slidably fitted to the oblique grooves 27. However, instead of the oblique grooves 27, oblique protrusions may be provided to the holder 20 and oblique grooves to be slidably fitted to the protrusions may be provided to the sliding piece 50.

In the undercut processing mechanism of the present invention, the sectional shapes of the oblique grooves 27, the protrusions 45, 46, fitting portions, or engagement portions, which are fitted to or engaged with each other, are not limited to rectangular shapes shown in the drawings, but may be round shapes, triangular shapes or the like. In the undercut processing mechanism of the present invention, restrictor for the holders 20, 21, the retaining pieces 30, 36, 40 and the sliding piece 50 are not limited to those shown in the above embodiments. For example, a linear guide may be used as a restrictor.

In the forming mold 3 of the third embodiment, compression coil springs are used as the driving spring 252 of the undercut driving mechanism 250. However, instead of compression coil springs, pull springs may be used. In the case of using pull springs, the pull springs may be provided under the driving plate 251. Instead of the driving springs, an electromagnet or a hydraulic cylinder that operates only in one direction may be used.

In the undercut processing mechanism and the forming mold of the present invention, a corner and a side edge of each component may be, for example, rounded or chamfered.

The materials of the constituent members used for the undercut processing mechanism and the forming mold of the present invention are not limited to specific materials, but the same materials as those of members used for known undercut processing mechanism and forming mold may be used as appropriate. However, the sliding surface of each constituent member is preferably formed from a material having a good slidability or a material that has been subjected to surface treatment so as to have a good slidability. Contact between the sliding surfaces is not limited to surface contact, but may be line contact or point contact.

The undercut processing mechanism of the present invention is applicable to a forming mold that opens/closes in the horizontal direction, the vertical direction or another direction.

The undercut processing mechanism and the forming mold of the present invention can be suitably used for a forming mold such as a die-casting mold, a mold press forming mold and the like, other than the injection mold.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2, 3 . . . forming mold
11, 12, 13 . . . undercut processing mechanism
20, 21 . . . holder
24 . . . inner side surface of holder
27 . . . oblique groove
30, 36, 40 . . . retaining piece
45, 46 . . . engagement protrusion
47 . . . connection portion
50 . . . sliding piece
52 . . . lower end of the sliding piece
60 . . . molding core
65 . . . first molding core
101, 103 . . . fixed die
105 . . . fixed-side die plate
106 . . . cavity
120 . . . fixed-side attachment plate
125 . . . housing portion
151, 152, 153 . . . movable die
161 . . . movable-side die plate
162 . . . core
171 . . . second molding core
185 . . . movable-side receiving plate
190 . . . ejector mechanism 200 . . . ejection pin
210 . . . separation distance restrictor
250 . . . undercut driving mechanism
252 . . . driving spring
P . . . molded product
P1, P1a, P1b . . . undercut portion
P2 . . . protruding portion

What is claimed is:

1. An undercut processing mechanism that is attached to and used in a fixed die or a movable die of a forming mold for molding a molded product having an undercut portion, the undercut processing mechanism comprising:
   a sliding piece having a molding core for forming the undercut portion;
   a holder provided to the fixed die or the movable die, the holder having a guide configured to guide the sliding piece so that the molding core is detached from the undercut portion; and
   a retaining piece slidably accommodated in the holder, and the retaining piece slidably engaged with the sliding piece, wherein
   the holder and the retaining piece are configured such that one of the holder and the retaining piece is allowed to advance/retract relative to the other thereof,
   the sliding piece and the retaining piece have engagement units that are slidably engaged with each other,
   the engagement unit of the retaining piece includes a first engagement element and a second engagement element formed contiguously to the first engagement element,
   the first engagement element guides the sliding piece so that the molding core is detached from the undercut portion, and
   the second engagement element guides the sliding piece so that the molding core completely detached from the undercut portion moves away from the molded product, or guides the sliding piece so that the molding core in a process of being detached from the undercut portion continues being detached from the undercut portion and moves away from the molded product,
   thus enabling the molding core to be detached from the undercut portion and move away from the molded product.

2. The undercut processing mechanism as claimed in claim 1, wherein
   the first engagement element is disposed in parallel to a pull-off direction of the undercut portion, and
   the second engagement element is disposed so as to cross the pull-off direction of the undercut portion.

3. The undercut processing mechanism as claimed in claim 1, wherein
   one of the engagement units of the sliding piece and the retaining piece is formed as a protrusion;
   the other of the engagement units of the sliding piece and the retaining piece is formed as a dovetail groove to be slidably fitted to the protrusion,
   when the engagement unit of the retaining piece is formed as the protrusion,
   the first engagement element and the second engagement element are both formed as a protrusion, and
   when the engagement unit of the retaining piece is formed as the dovetail groove, the first engagement element and the second engagement element are both formed as a dovetail groove.

4. The undercut processing mechanism as claimed in claim 1, wherein
   the holder is fixed to a movable-side die plate having a core for forming an inner side of the molded product, or is formed integrally with the movable-side die plate,
   an ejection pin is provided which causes the retaining piece to advance or retract in synchronization with an ejector mechanism for ejecting the molded product, and
   the retaining piece is ejected along with an ejection operation for the molded product, so that the molding core moves so as to be detached from the undercut portion and be away from the molded product.

5. The undercut processing mechanism as claimed in claim 1, wherein
   the movable die includes: a movable-side die plate having a core for forming an inner side of the molded product; and a movable-side receiving plate capable of advancing/retracting relative to the movable-side die plate,
   the molding core for forming the undercut portion is a first molding core, and the movable die further includes: a second molding core which, in a mold clamped state, is adjacent to the first molding core and forms an inner side of the molded product,
   an interval restrictor is provided, the interval restrictor being connected with the fixed die and the movable-side die plate, the interval restrictor restricting an interval between the fixed die and the movable-side die plate at a time of mold opening,
   the holder and the second molding core are fixed to the movable-side receiving plate,
   the retaining piece is fixed to the movable-side die plate,
   when the movable die retracts from the fixed die through mold opening and reaches a position restricted by the interval restrictor, retraction of the movable-side die plate is stopped and only the movable-side receiving plate continues retracting, and
   by the movable-side receiving plate being separated from the movable-side die plate, the molding core moves so as to be detached from the undercut portion and be away from the molded product.

6. The undercut processing mechanism as claimed in claim 1, further comprising a driving unit configured to advance/retract the retaining piece, wherein
   the fixed die includes: a fixed-side die plate having a cavity for forming an outer side of the molded product; and a fixed-side attachment plate having a housing portion for the driving unit and connected with the fixed-side die plate,
   the holder is fixed to or formed integrally with the fixed-side die plate, and
   the retaining piece is accommodated in the housing portion, and is ejected by the driving unit in conjunction with mold opening, so that the molding core moves so as to be detached from the undercut portion and be away from the molded product.

7. A forming mold comprising the undercut processing mechanism as claimed in claim 1.

8. The undercut processing mechanism of claim 1, wherein the first engagement element is disposed in a first direction, and the second engagement element is disposed in a second direction differing from the first direction.

* * * * *